United States Patent
Nishijima et al.

(10) Patent No.: US 10,603,985 B2
(45) Date of Patent: Mar. 31, 2020

(54) LIQUID EJECTOR AND EJECTOR REFRIGERATION CYCLE

(71) Applicant: DENSO CORPORATION, Kariya, Aichi-pref. (JP)

(72) Inventors: Haruyuki Nishijima, Kariya (JP); Gouta Ogata, Kariya (JP); Yoshiaki Takano, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 250 days.

(21) Appl. No.: 15/506,761

(22) PCT Filed: Sep. 1, 2015

(86) PCT No.: PCT/JP2015/004446
§ 371 (c)(1),
(2) Date: Feb. 27, 2017

(87) PCT Pub. No.: WO2016/035330
PCT Pub. Date: Mar. 10, 2016

(65) Prior Publication Data
US 2017/0253106 A1    Sep. 7, 2017

(30) Foreign Application Priority Data

Sep. 4, 2014 (JP) .................. 2014-179773
Feb. 20, 2015 (JP) .................. 2015-031458

(51) Int. Cl.
*B60H 1/32* (2006.01)
*F04F 5/24* (2006.01)
(Continued)

(52) U.S. Cl.
CPC .......... *B60H 1/3223* (2013.01); *B60H 1/323* (2013.01); *F04F 5/04* (2013.01); *F04F 5/24* (2013.01);
(Continued)

(58) Field of Classification Search
CPC .................. B60H 1/3223; B60H 1/323; B60H 2001/3289; B60H 2001/3298; F25B 41/00;
(Continued)

(56) References Cited

U.S. PATENT DOCUMENTS 6,675,609 B2 * 1/2004 Takeuchi .................. F25B 1/08
62/500
9,523,521 B2 * 12/2016 Awa ....................... F25B 29/003
(Continued)

FOREIGN PATENT DOCUMENTS

JP          3690030 B2    8/2005
JP          4032875 B2    1/2008
(Continued)

OTHER PUBLICATIONS

Mark J. Bergander, "Refrigeration Cycle with Two-Phase Condensing Ejector", Purdue University School of Engineering International Refrigeration and Air Conditioning Conference, Jul. 17-20, 2006, pp. 1-8.
(Continued)

*Primary Examiner* — Joseph F Trpisovsky
(74) *Attorney, Agent, or Firm* — Harness, Dickey & Pierce, P.L.C.

(57) ABSTRACT

A refrigerant that has flowed out of a liquid ejector radiates heat in a radiator, and a liquid-phase refrigerant that has radiated heat in the radiator flows into an ejection refrigerant passage of the liquid ejector. A discharged refrigerant of a compressor that suctions the refrigerant that has flowed out of a low-pressure evaporator flows into an inflow refrigerant passage of the liquid ejector. An ejector adopted as the liquid ejector is one in which an ejection refrigerant is ejected from the ejection refrigerant passage to a gas-liquid mixing portion, and the ejection refrigerant is ejected on an outer
(Continued)

circumferential side of the inflow refrigerant flowing from the inflow refrigerant passage into the gas-liquid mixing portion.

4 Claims, 17 Drawing Sheets

(51) Int. Cl.
*F04F 5/54* (2006.01)
*F04F 5/46* (2006.01)
*F25B 41/00* (2006.01)
*F04F 5/04* (2006.01)
*F04F 5/36* (2006.01)

(52) U.S. Cl.
CPC ............... *F04F 5/36* (2013.01); *F04F 5/46* (2013.01); *F04F 5/54* (2013.01); *F25B 41/00* (2013.01); *B60H 2001/3289* (2013.01); *B60H 2001/3298* (2013.01); *F25B 2341/0012* (2013.01); *F25B 2341/0015* (2013.01)

(58) Field of Classification Search
CPC ...... F25B 2341/0015; F25B 2341/0012; F25B 2341/0013; F04F 5/04; F04F 5/24; F04F 5/36; F04F 5/46; F04F 5/54
USPC .......................................................... 62/498
See application file for complete search history.

(56) References Cited

U.S. PATENT DOCUMENTS

| | | | |
|---|---|---|---|
| 2001/0027664 A1* | 10/2001 | Ross | F25B 40/04 62/513 |
| 2002/0030121 A1* | 3/2002 | Kyotani | F04F 5/16 239/310 |
| 2003/0005717 A1 | 1/2003 | Takeuchi et al. | |
| 2003/0066301 A1 | 4/2003 | Takeuchi | |
| 2007/0186572 A1* | 8/2007 | Nishida | F25B 41/00 62/170 |
| 2016/0116195 A1 | 4/2016 | Nishijima et al. | |
| 2016/0186783 A1 | 6/2016 | Nishijima et al. | |

FOREIGN PATENT DOCUMENTS

| | | |
|---|---|---|
| JP | 4103712 B2 | 6/2008 |
| JP | 4463466 B2 | 5/2010 |
| WO | WO-2014203460 A1 | 12/2014 |

OTHER PUBLICATIONS

Mark J. Bergander et al., "Refrigeration Cycle With Ejector for Second Step Compression", Purdue University School of Engineering International Refrigeration and Air Conditioning Conference, Jul. 12-15, 2010, pp. 1-8.

\* cited by examiner

GAS-LIQUID MIXING PORTION

DIVERGENT PASSAGE PORTION

LIQUID EJECTOR AND EJECTOR REFRIGERATION CYCLE

CROSS REFERENCE TO RELATED APPLICATIONS

This application is a U.S. National Phase Application under 35 U.S.C. 371 of International Application No. PCT/JP2015/004446 filed on Sep. 1, 2015 and published in Japanese as WO 2016/035330 A1 on Mar. 10, 2016. This application is based on and claims the benefit of priority from Japanese Patent Applications No. 2014-179773 filed on Sep. 4, 2014, and No. 2015-031458 filed on Feb. 20, 2015. The entire disclosures of all of the above applications are incorporated herein by reference.

TECHNICAL FIELD

The present disclosure relates to a liquid ejector and an ejector refrigeration cycle including the liquid ejector.

BACKGROUND ART

Up to now, an ejector refrigeration cycle that is a vapor compression refrigeration cycle device having an ejector has been known. Also, as an ejector applied to an ejector refrigeration cycle, for example, Patent Document 1 discloses an ejector that mixes a gas-liquid two-phase ejection refrigerant ejected from a nozzle portion with a drawn refrigerant in the gas-phase state drawn from a refrigerant suction port, and the ejector increases a pressure of a mixture refrigerant of the gas-liquid two-phase state in a diffuser portion (pressurizing portion).

In such a two-phase flow ejector that increases the pressure of the mixture refrigerant in the gas-liquid two-phase state in the diffuser portion, an energy loss such as a wall surface viscosity loss caused by a friction between the mixture refrigerant flowing at a comparatively high speed and a wall surface of the diffuser portion is large. For that reason, an ejector efficiency tends to be lowered. The ejector efficiency means an energy conversion efficiency when converting an energy recovered by the ejector into a pressure energy.

On the other hand, Non Patent Document 1 discloses a liquid ejector that ejects a liquid-phase refrigerant accelerated to a sound speed or higher from an ejection refrigerant passage provided in a nozzle portion, and discloses an ejector refrigeration cycle including the liquid ejector.

In the liquid ejector of Non Patent Document 1, in a gas-liquid mixing portion, an ejection refrigerant of the liquid-phase state which is ejected from the ejection refrigerant passage is mixed with an inflow refrigerant in the gas-phase state introduced from an outside, and a flow rate of a mixture refrigerant of the ejection refrigerant and the inflow refrigerant is reduced to a subsonic speed. With the use of shock waves generated when the mixture refrigerant shifts from a supersonic speed state to a subsonic speed state, the mixture refrigerant is increased in pressure within a relatively short distance, and a gas-phase refrigerant in the mixture refrigerant is condensed.

As a result, in the liquid ejector of Non Patent Document 1, an energy loss such as a wall surface viscosity loss is suppressed to attempt an improvement in an ejector efficiency.

PRIOR ART DOCUMENT

Patent Document

Patent Document 1: JP 3690030 B2
Non Patent Document 1: Mark J. Bergander et al., Refrigeration Cycle With Ejector for Second Step Compression, International Refrigeration and Air Conditioning Conference at Purdue, (US), International Refrigeration and Air Conditioning Conference, Jul. 12-15, 2010, 2211, Page 1-8, [searched on Aug. 1, 2014], Internet <URL:http://docs.lib.purdue.edu/iracc/1053/>

SUMMARY

However, when the inventors have actually confirmed the ejector efficiency of the liquid ejector disclosed in Non Patent Document 1, it is found that an obtained efficiency improvement effect is insufficient as compared with a theoretically obtained ejector efficiency. As a result, it is found that a sufficient coefficient of performance (COP) improvement effect is not obtained even for the whole ejector refrigeration cycle.

Under the circumstances, the present inventors have investigated a cause of the problem. As a result, it is found that the cause is that in the liquid ejector disclosed in Non Patent Document 1, the mixture refrigerant mixed in the mixing portion is not put into an ideal gas-liquid mixed state in which fine particles of the gas-phase refrigerant are uniformly mixed in the liquid-phase refrigerant.

The present inventors have conceived that the reason is because unless the mixture refrigerant is in an ideal mixed state, the condensation of parts of the gas-phase refrigerant which are relatively large particles is delayed and the energy loss cannot be sufficiently suppressed.

In view of the above points, it is an object of the present disclosure to provide an ejector refrigeration cycle that is capable of sufficiently improving an ejector efficiency of a liquid ejector.

Another object of the present disclosure is to improve a coefficient of performance of the ejector refrigeration cycle including the liquid ejector.

Another object of the present disclosure is to sufficiently improve the ejector efficiency of the liquid ejector.

According to a first aspect of the present disclosure, an ejector refrigeration cycle includes a liquid ejector, a radiator, a pumping device, a depressurizing device, a low-pressure evaporator and a compressor. The liquid ejector includes an inflow passage forming portion having an inflow refrigerant passage into which a refrigerant flows from an outside, and a liquid ejection body portion having a gas-liquid mixing portion that mixes an ejection refrigerant ejected from an ejection refrigerant passage with an inflow refrigerant flowing from the inflow refrigerant passage, the ejection refrigerant passage depressurizing and ejecting a liquid-phase refrigerant. The radiator radiates a heat of the refrigerant that has flowed out of the liquid ejector. The pumping device pumps the liquid-phase refrigerant that has radiated the heat in the radiator. The depressurizing device depressurizes the refrigerant on a downstream side of the radiator. The low-pressure evaporator evaporates the refrigerant depressurized by the depressurizing device. The compressor draws, compresses and discharges the refrigerant that has flowed out of the low-pressure evaporator. The ejection refrigerant passage includes a first refrigerant inflow port into which the liquid-phase refrigerant pumped from the pumping device flows, and a refrigerant ejection port through which the ejection refrigerant is ejected into the gas-liquid mixing portion. The inflow refrigerant passage includes a second refrigerant inflow port into which the refrigerant discharged from the compressor flows, and a refrigerant outflow port through which the inflow refrigerant flows out to the gas-liquid mixing portion. The refrigerant ejection port has an annular shape in a cross section perpendicular to an ejection direction of the ejection refrigerant. The refrigerant outflow port is disposed on an inner circumferential side of the refrigerant ejection port. In the liquid ejector, upon the ejection refrigerant being ejected to the gas-liquid mixing portion, the ejection refrigerant is ejected on an outer circumferential side of the inflow refrigerant flowing into the gas-liquid mixing portion.

According to the above configuration, the refrigerant ejection port of the ejection refrigerant passage has an annular shape, and the refrigerant outflow port of the inflow passage forming portion is disposed on the inner circumferential side of the refrigerant ejection port. Hence, the hydraulic diameter of the refrigerant outflow port can be easily set to be smaller than a hydraulic diameter of the refrigerant ejection port.

Therefore, a flow rate of the inflow refrigerant flowing into the gas-liquid mixing portion from the refrigerant outflow port can be increased in comparison with the case where the refrigerant outflow port is formed in an annular shape and the refrigerant ejection port is disposed on the inner circumferential side of the refrigerant outflow port. With an increase in the flow rate of the inflow refrigerant, a contact area between the ejection refrigerant and the inflow refrigerant per unit time in the gas-liquid mixing portion can be increased, and the ejection refrigerant and the inflow refrigerant are easily mixed together in the gas-liquid mixing portion.

As a result, the mixture refrigerant of the ejection refrigerant and the inflow refrigerant in the gas-liquid mixing portion can be brought close to an ideal gas-liquid mixed state, and the ejector efficiency of the liquid ejector can be sufficiently improved. In other words, the ejector refrigeration cycle capable of sufficiently improving the ejector efficiency of the liquid ejector can be provided.

Further, since the discharged refrigerant pressure of the compressor can be lowered by improvement in the ejector efficiency of the liquid ejector, the coefficient of performance (COP) of the ejector refrigeration cycle can be improved.

According to a second aspect of the present disclosure, an ejector refrigeration cycle includes a liquid ejector, a radiator, a pumping device, a low-pressure ejector, a depressurizing device, a low-pressure evaporator and a compressor. The liquid ejector includes an inflow passage forming portion having an inflow refrigerant passage into which a refrigerant flows from an outside, and a liquid ejection body portion having a gas-liquid mixing portion that mixes an ejection refrigerant ejected from an ejection refrigerant passage with an inflow refrigerant flowing from the inflow refrigerant passage, the ejection refrigerant passage depressurizing and ejecting a liquid-phase refrigerant. The radiator radiates a heat of the refrigerant that has flowed out of the liquid ejector. The pumping device pumps the liquid-phase refrigerant that has radiated the heat in the radiator. The low-pressure ejector includes a low-pressure pressurizing portion that draws the refrigerant through a low-pressure refrigerant suction port by a suction action of a low-pressure ejection refrigerant ejected from a low-pressure nozzle portion that depressurizes the refrigerant that has flowed out of the radiator. The low-pressure pressurizing portion pressur- izes a mixture refrigerant of the low-pressure ejection refrigerant and a low-pressure drawn refrigerant drawn through the low-pressure refrigerant suction port. The depressurizing device depressurizes the refrigerant on a downstream side of the radiator. The low-pressure evaporator evaporates the refrigerant depressurized by the depressurizing device. The compressor draws, compresses and discharges the refrigerant that has flowed out of the low-pressure pressurizing portion. The ejection refrigerant passage includes a first refrigerant inflow port into which the liquid-phase refrigerant pumped from the pumping device flows, and a refrigerant ejection port through which the ejection refrigerant is ejected into the gas-liquid mixing portion. The inflow refrigerant passage includes a second refrigerant inflow port into which the refrigerant discharged from the compressor flows, and a refrigerant outflow port through which the inflow refrigerant flows out to the gas-liquid mixing portion. The refrigerant ejection port has an annular shape in a cross section perpendicular to an ejection direction of the ejection refrigerant. The refrigerant outflow port is disposed on an inner circumferential side of the refrigerant ejection port. In the liquid ejector, upon the ejection refrigerant being ejected to the gas-liquid mixing portion, the ejection refrigerant is ejected on an outer circumferential side of the inflow refrigerant flowing into the gas-liquid mixing portion.

According to the above configuration, the refrigerant ejection port of the ejection refrigerant passage has the annular shape, and the refrigerant outflow port of the inflow passage forming portion is disposed on the inner circumferential side of the ejection refrigerant passage. Hence, the ejector efficiency of the liquid ejector can be sufficiently improved as in the first aspect. In other words, the ejector refrigeration cycle capable of sufficiently improving the effector efficiency of the liquid ejector can be provided.

Further, since the discharged refrigerant pressure of the compressor can be lowered by improvement in the ejector efficiency of the liquid ejector, the COP of the ejector refrigeration cycle can be improved.

In addition, since the refrigerant that has flowed out from the low-pressure pressurizing portion of the low-pressure ejector is drawn into the compressor, the intake refrigerant pressure of the compressor can be increased to reduce a power consumption of the compressor. Therefore, the COP of the ejector refrigeration cycle can be further improved.

According to a third aspect of the present disclosure, an ejector refrigeration cycle includes a liquid ejector, a radiator, a pumping device, a depressurizing device, a low-pressure evaporator, a compressor and an area changing device. The liquid ejector includes an ejection refrigerant passage forming portion having an ejection refrigerant passage depressurizing and ejecting a liquid-phase refrigerant, and a liquid ejection body portion having a gas-liquid mixing portion that mixes an inflow refrigerant flowing from a first refrigerant inflow port with an ejection refrigerant ejected from the ejection refrigerant passage. The radiator radiates a heat of the refrigerant that has flowed out of the liquid ejector. The pumping device pumps the liquid-phase refrigerant, which has radiated the heat in the radiator, toward a second refrigerant inflow port through the ejection refrigerant passage. The depressurizing device depressurizes the refrigerant on a downstream side of the radiator. The low-pressure evaporator evaporates the refrigerant depressurized by the depressurizing device. The compressor draws and compresses the refrigerant that has flowed out of the low-pressure evaporator, and discharges the refrigerant toward the first refrigerant inflow port. The area changing device changes a passage cross-sectional area of a refrigerant passage extending from an outlet side of the liquid ejector to an inlet side of the radiator.

According to the above configuration, since the area changing device is provided, as will be described in embodiments to be described later, the reflected wave standing on the downstream side of the gas-liquid mixing portion is resonated so as to increase a pressure difference obtained by subtracting the pressure of the compressor discharged refrigerant from the pressure of the radiator inlet side refrigerant. As a result, the COP of the ejector refrigeration cycle including the liquid ejector can be improved.

According to a fourth aspect of the present disclosure, an ejector refrigeration cycle includes, a liquid ejector, a radiator, a pumping device, a low-pressure ejector, a depressurizing device, a low-pressure evaporator, a compressor and an area changing device. The liquid ejector includes an ejection refrigerant passage forming portion having an ejection refrigerant passage depressurizing and ejecting a liquid-phase refrigerant, and a liquid ejection body portion having a gas-liquid mixing portion that mixes an inflow refrigerant flowing from a first refrigerant inflow port with an ejection refrigerant ejected from the ejection refrigerant passage. The radiator radiates a heat of the refrigerant that has flowed out of the liquid ejector. The pumping device pumps the liquid-phase refrigerant, which has radiated the heat in the radiator, toward a second refrigerant inflow port through the ejection refrigerant passage. The low-pressure ejector includes a low-pressure pressurizing portion that draws the refrigerant through a low-pressure refrigerant suction port by a suction action of a low-pressure ejection refrigerant ejected from a low-pressure nozzle portion that depressurizes the refrigerant that has flowed out of the radiator. The low-pressure pressurizing portion pressurizes a mixture refrigerant of the low-pressure ejection refrigerant and a low-pressure drawn refrigerant drawn through the low-pressure refrigerant suction port. The depressurizing device depressurizes the refrigerant on a downstream side of the radiator. The low-pressure evaporator evaporates the refrigerant depressurized by the depressurizing device. The compressor draws and compresses the refrigerant that has flowed out of the low-pressure pressurizing portion, and discharges the refrigerant toward the first refrigerant inflow port. The area changing device changes a passage cross-sectional area of a refrigerant passage extending from an outlet side of the liquid ejector to an inlet side of the radiator.

According to the above configuration, since the area changing device is provided, the COP of the ejector refrigeration cycle including the liquid ejector can be improved as in the third aspect.

Further, since the refrigerant that has flowed out from the low-pressure pressurizing portion of the low-pressure ejector is drawn into the compressor, the intake refrigerant pressure of the compressor can be increased to reduce a power consumption of the compressor. Therefore, the COP of the ejector refrigeration cycle including the liquid ejector can be further improved.

According to a fifth aspect of the present disclosure, a liquid ejector is used for a vapor compression refrigeration cycle device including a compressor that compresses and discharges a refrigerant and a radiator that radiates a heat of the refrigerant. The liquid ejector includes an inflow passage forming portion and a liquid ejection body portion. The inflow passage forming portion includes an inflow refrigerant passage into which the refrigerant flows from an outside. The liquid ejection body portion includes a gas-liquid mixing portion that mixes an ejection refrigerant ejected from an ejection refrigerant passage depressurizing and ejecting a liquid-phase refrigerant with an inflow refrigerant flowing from the inflow refrigerant passage. The ejection refrigerant passage includes a first refrigerant inflow port into which the liquid-phase refrigerant that has radiated the heat in the radiator flows, and a refrigerant ejection port that ejects the refrigerant into the gas-liquid mixing portion. The inflow refrigerant passage includes a second refrigerant inflow port into which the refrigerant discharged from the compressor flows, and a refrigerant outflow port from which the refrigerant flows out to the gas-liquid mixing portion. The refrigerant ejection port has an annular shape in a cross-section perpendicular to an ejection direction of the ejection refrigerant. The refrigerant outflow port is disposed on an inner circumferential side of the ejection refrigerant passage. Upon the ejection refrigerant being ejected into the gas-liquid mixing portion, the ejection refrigerant is ejected on an outer circumferential side of the inflow refrigerant flowing into the gas-liquid mixing portion.

According to the above configuration, the refrigerant ejection port of the ejection refrigerant passage is formed in the annular shape, and the refrigerant outflow port of the inflow passage forming portion is disposed on the inner circumferential side of the refrigerant ejection port. Hence, the hydraulic diameter of the refrigerant ejection port can be easily set to be smaller than the hydraulic diameter of the refrigerant ejection port.

Therefore, a flow rate of the inflow refrigerant flowing into the gas-liquid mixing portion from the refrigerant outflow port can be increased in comparison with the case where the refrigerant outflow port is formed in the annular shape and the refrigerant ejection port is disposed on the inner circumferential side of the refrigerant inflow port. With an increase in the flow rate of the inflow refrigerant, a contact area between the ejection refrigerant and the inflow refrigerant per unit time in the gas-liquid mixing portion can be increased, and the ejection refrigerant and the inflow refrigerant are easily mixed together in the gas-liquid mixing portion.

As a result, the mixture refrigerant of the ejection refrigerant and the inflow refrigerant in the gas-liquid mixing portion can be brought close to an ideal gas-liquid mixed state, and the ejector efficiency of the liquid ejector can be sufficiently improved.

DESCRIPTION OF EMBODIMENTS

Figure 1:
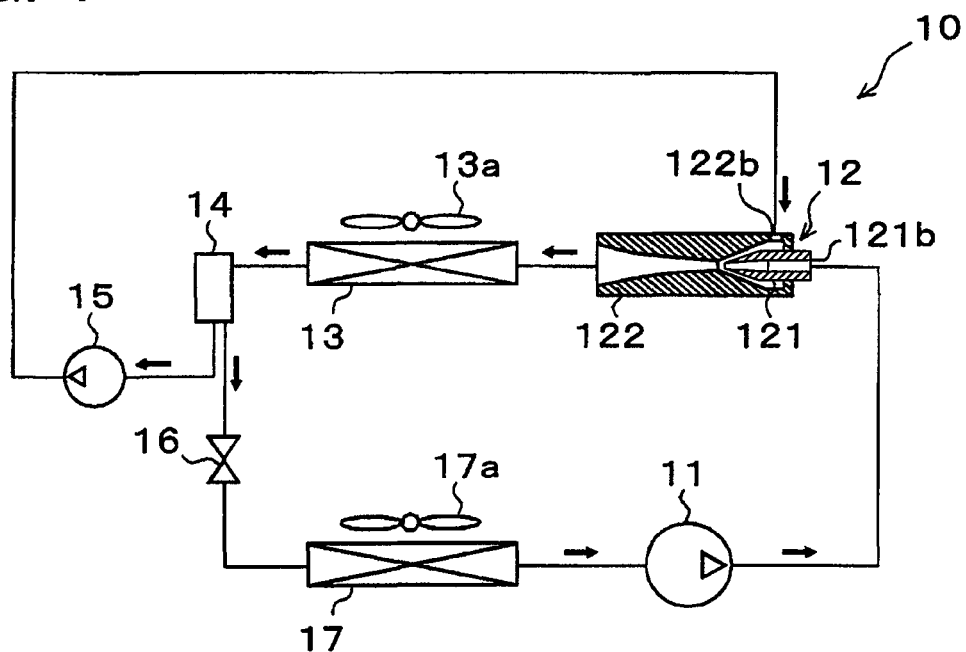
FIG. 1 is a schematic diagram of an ejector refrigeration cycle according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 5. In the present embodiment, an ejector refrigeration cycle 10 that is a vapor compression refrigeration cycle device having a liquid ejector 12 is applied to a vehicle air conditioning apparatus. More specifically, the ejector refrigeration cycle 10 performs a function of cooling a blown air blown into a vehicle compartment which is an air-conditioning target space.

In addition, an HFC based refrigerant (more specifically, R-134a) is applied as the refrigerant in the ejector refrigeration cycle 10, and a vapor compression type subcritical refrigeration cycle in which high-pressure refrigerant pressure does not exceed critical pressure of the refrigerant is configured. Furthermore, refrigerator oil for lubricating a compressor 11 is mixed in the refrigerant, and a part of the refrigerator oil circulates in the cycle together with the refrigerant.

In the ejector refrigeration cycle 10 depicted in the overall configuration diagram of FIG. 1, a compressor 11 suctions a refrigerant, compresses the refrigerant, and discharges the refrigerant. More specifically, the compressor 11 according to the present embodiment is an electric compressor that is configured by accommodating a fixed-capacity-type compression mechanism and an electric motor for driving the compression mechanism in one housing.

Any of various types of compression mechanisms, such as a scroll-type compression mechanism and a vane-type compression mechanism, can be employed as the compression mechanism. In addition, operation (number of rotations) of the electric motor is controlled according to a control signal output from a control device, which will be described below, and any type of an AC motor and a DC motor can be employed. A refrigerant inflow port 121b (second refrigerant inflow port) side of the liquid ejector 12 is connected to a discharge port of the compressor 11.

The liquid ejector 12 is a pressure increasing device that mixes a gas-phase refrigerant with a liquid-phase refrigerant which is accelerated to a speed equal to or higher than a fluid sound speed or to the same degree as the liquid sound speed, and increases the mixture refrigerant with the use of shock waves generated when the flow rate of the mixture refrigerant is reduced down to a subsonic speed. Furthermore, the liquid ejector 12 is an energy conversion device that converts a kinetic energy of the mixture refrigerant into a pressure energy since the pressure of the mixture refrigerant is increased by decreasing the flow rate of the mixture refrigerant.

Figure 2:
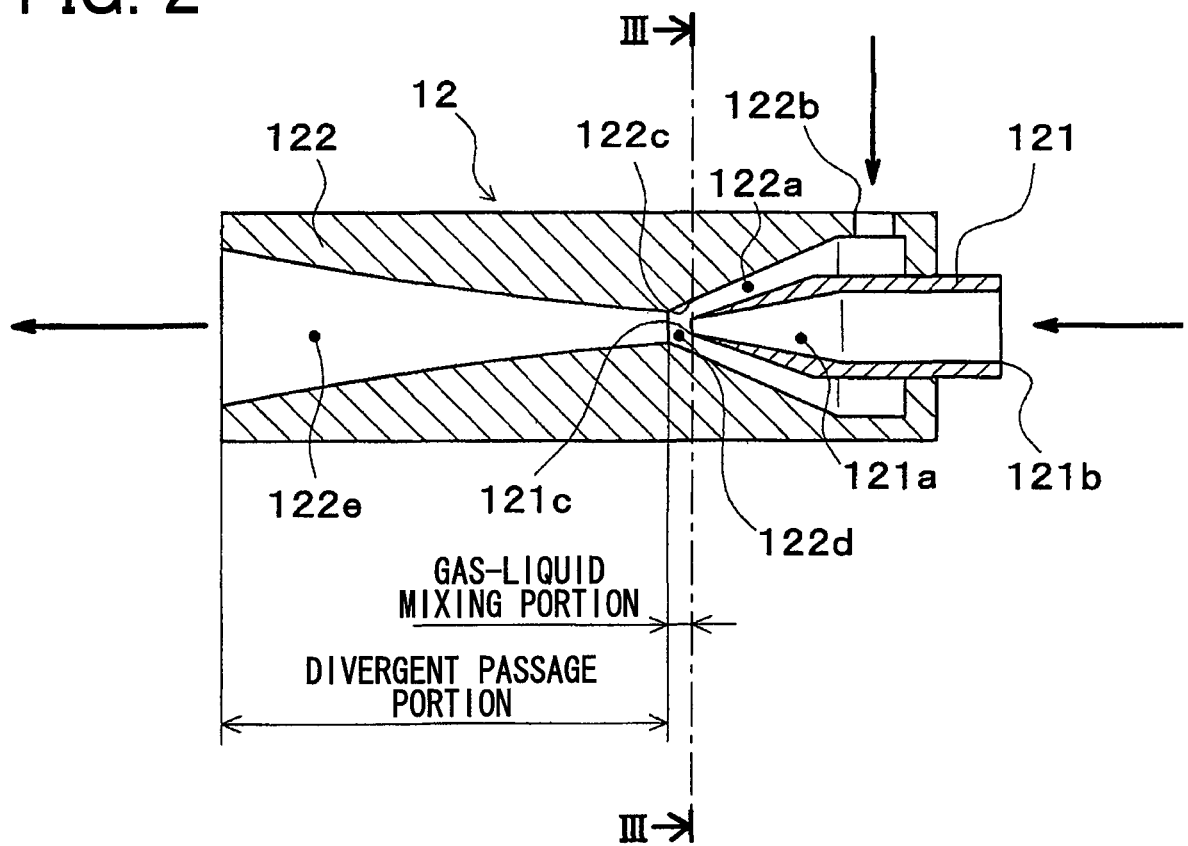
FIG. 2 is a cross-sectional view parallel to an axis direction of a liquid ejector according to the first embodiment.

A detailed configuration of the liquid ejector 12 will be described with reference to FIGS. 2 and 3. The liquid ejector 12 includes an inflow passage forming portion 121 and a liquid ejection body portion 122. The inflow passage forming portion 121 is formed of a substantially cylindrical metal (for example, a stainless steel alloy) which gradually tapers toward a flow direction of the refrigerant. An inflow refrigerant passage 121a extending in an axial direction is provided inside of the inflow passage forming portion 121.

The refrigerant inflow port 121b for allowing a refrigerant (inflow refrigerant) discharged from the compressor 11 to flow in from the outside is provided at a most upstream portion of the inflow refrigerant passage 121a in the refrigerant flow. A refrigerant outflow port 121c for allowing the inflow refrigerant flowing into the inflow refrigerant passage 121a from the refrigerant inflow port 121b to flow out is provided at a most downstream portion of the inflow refrigerant passage 121a in the refrigerant flow.

Further, a passage cross-sectional area of the inflow refrigerant passage 121a on the downstream side is gradually reduced toward the refrigerant outflow port 121c. Therefore, the passage cross-sectional area at the refrigerant outflow port 121c is the smallest passage sectional area of the inflow refrigerant passage 121a. In other words, the inflow passage forming portion 121 according to the present embodiment is identical in the structure with a convergent nozzle. For that reason, the flow rate of the inflow refrigerant flowing out from the refrigerant outflow port 121c is increased more than the flow rate of the inflow refrigerant flowing into the inflow refrigerant passage 121a from the refrigerant inflow port 121b.

The liquid ejection body portion 122 is made of metal (for example, aluminum) or resin formed into substantially a cylindrical shape, functions as a fixing member for internally supporting and fixing the inflow passage forming portion 121, and forms an outer shell of the liquid ejector 12. More specifically, the inflow passage forming portion 121 according to the present embodiment is fixed by press-fitting or the like so as to be accommodated on the inside of the liquid ejection body portion 122 on one end side in the longitudinal direction.

A driving refrigerant inflow port 122b (first refrigerant inflow port) that is provided so as to communicate with the refrigerant outflow port 121c of the inflow passage forming portion 121 through an inside and an outside of the inflow passage forming portion 121 is provided on an outer circumferential side of the inflow passage forming portion 121 in a cylindrical side surface of the liquid ejection body portion 122. The driving refrigerant inflow port 122b is a through hole for allowing liquid-phase refrigerant pressure-fed from a liquid pump 15 to be described later to flow into the liquid ejection body portion 122.

An ejection refrigerant passage 122a in which the liquid-phase refrigerant flowed from the driving refrigerant inflow port 122b into the inside of the liquid ejector 12 is isentropically reduced in pressure and ejected is provided between the inner circumferential wall surface of the liquid ejection body portion 122 and the outer circumferential wall surface of the inflow passage forming portion 121. A refrigerant ejection port 122c is provided at the most downstream portion of the refrigerant flow in the ejection refrigerant passage 122a.

Figure 3:
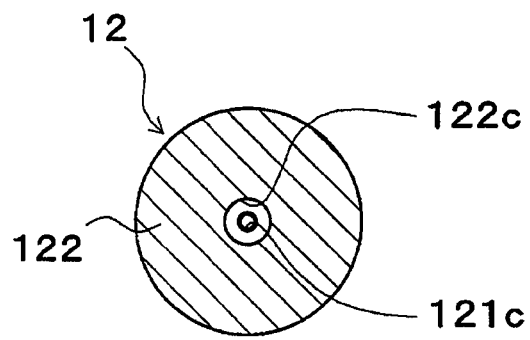
FIG. 3 is a cross-sectional view taken along a line III-III of FIG. 2.

As illustrated in FIG. 3, the refrigerant ejection port 122c has an annular shape in cross section (a donut shape obtained by excluding a circular shape having a smaller diameter from a coaxially-arranged circular shape having a larger diameter) perpendicular to an ejection direction of the refrigerant (an axial direction of the inflow passage forming portion 121). The refrigerant outflow port 121c of the inflow passage forming portion 121 is disposed on an inner circumferential side of the refrigerant ejection port 122c.

Further, a passage cross-sectional area of the ejection refrigerant passage 122a on the downstream side is gradually reduced toward the refrigerant ejection port 122c. More specifically, during the normal operation of the ejector refrigeration cycle 10, the passage cross-sectional area is reduced so that the liquid ejection refrigerant from the refrigerant ejection port 122c in the liquid-phase state is equal to or more than the fluid sound speed or to the same degree as the fluid sound speed. The fluid sound speed means the speed of the sound traveling through the liquid-phase refrigerant.

A gas-liquid mixing portion 122d and a divergent passage portion 122e are provided inside of the liquid ejection body portion 122.

The gas-liquid mixing portion 122d is a gas-liquid mixing space that allows the ejection refrigerant in the liquid-phase state from the refrigerant ejection port 122c to be mixed with the gas-phase state inflow refrigerant that has flowed out from the refrigerant outflow port 121c. The gas-liquid mixing portion 122d of the present embodiment is formed in a substantially truncated cone shape whose passage cross-sectional area is gradually reduced toward a refrigerant flowing direction. The divergent passage portion 122e is a substantially truncated cone shaped space which gradually enlarges a passage cross-sectional area of the mixture refrigerant of the ejection refrigerant and the inflow refrigerant and allows the mixture refrigerant to flow toward the downstream side.

As illustrated in FIG. 1, a refrigerant outlet side of the divergent passage portion 122e of the liquid ejector 12 is connected with a refrigerant inlet side of a radiator 13. The radiator 13 is a radiation heat exchanger for exchanging a heat between the high-pressure refrigerant flowing out of the divergent passage portion 122e and a vehicle exterior air (outside air) blown by a cooling fan 13a to radiate the heat from the high-pressure refrigerant to cool the refrigerant. The cooling fan 13a is an electric blower, a rotating speed (blown air amount) of which is controlled by a control voltage output from the control device.

The inlet side of a liquid receiver (receiver) 14 is connected to the refrigerant outlet side of the radiator 13. The liquid receiver 14 is of a hollow cylindrical tank structure for storing the liquid-phase refrigerant flowing out of the radiator 13. Further, the liquid receiver 14 according to the present embodiment is equipped with multiple (two in the present embodiment) of liquid-phase refrigerant outflow ports.

An intake side of the liquid pump 15 is connected to one liquid-phase refrigerant outflow port of the liquid receiver 14. The liquid pump 15 is a pumping device that pumps the liquid-phase refrigerant, which has flowed out of the liquid receiver 14 and is subcooled, to a driving refrigerant inflow port 122b side of the liquid ejector 12. The liquid pump 15 is an electrically driven water pump whose rotational speed (liquid feed refrigerant pumping amount) is controlled by a control voltage output from the control device.

An inlet side of the expansion valve 16 is connected to the other liquid-phase refrigerant outflow port of the liquid receiver 14. The expansion valve 16 is a depressurizing device that depressurizes the refrigerant on the downstream side of the radiator 13 (specifically, the liquid-phase refrigerant flowing out of the liquid receiver 14). The expansion valve 16 of the present embodiment is configured by a temperature type expansion valve and adjusts the refrigerant flow rate so that the degree of superheat of the refrigerant on the outlet side of the low-pressure evaporator 17 comes closer to a predetermined reference degree of superheat.

As such a temperature type expansion valve, a configuration in which a temperature sensing unit having a displacement member which is displaced according to the temperature and the pressure of the refrigerant on the outlet side of the low-pressure evaporator 17, and the valve opening degree (refrigerant flow rate) is adjusted by a mechanical mechanism so that the degree of superheat of the outlet side refrigerant of the low-pressure evaporator 17 comes closer to a reference superheat degree according to the displacement of the displacement member, and so on can be employed.

The refrigerant inlet side of the low-pressure evaporator 17 is connected with an outlet side of the expansion valve 16. The low-pressure evaporator 17 is a heat-absorbing heat exchanger that exchanges the heat between the low-pressure refrigerant reduced in pressure by the expansion valve 16 and the blown air that is blown into the vehicle compartment from the blower fan 17a, to thereby evaporate the low-pressure refrigerant and perform a heat absorbing effect.

The blower fan 17a is an electric blower of which a rotation speed (the blown air amount) is controlled by a control voltage output from the control device. An intake port of the compressor 11 is connected to the refrigerant outlet side of the low-pressure evaporator 17. Heavy solid arrows illustrated in FIG. 1 indicate a flow of the refrigerant during the normal operation of the ejector refrigeration cycle 10. The same is applied to the following overall configuration diagram.

Next, an electric control unit of the present embodiment will be described. A control device not shown includes a well-known microcomputer having a CPU, a ROM, a RAM, and the like, and peripheral circuits, performs various arithmetic processing on the basis of a control program stored in the ROM, and controls the operation of various control target devices 11, 13a, 15, 17a, and so on connected to an output side of the control device.

Further, the control device is connected with a sensor group such as an inside air temperature sensor for detecting a vehicle interior temperature, an outside air temperature sensor for detecting the temperature of an outside air, an insolation sensor for detecting the amount of insolation in the vehicle compartment, an evaporator temperature sensor for detecting a blowing air temperature (evaporator temperature) blown from the low-pressure evaporator 17, and so on and receives detection values from those air conditioning sensor group.

Furthermore, an input side of the control device is connected with an operation panel not shown, and operation signals output from various operation switches mounted on the operation panel are input to the control device. An air conditioning operation switch used to request the execution of air conditioning, a vehicle interior temperature setting switch that is used to set the temperature of the vehicle interior, and the like are provided as the various operation switches that are mounted on the operation panel.

In control devices of the present embodiment, control devices which control operations of various control target devices connected to the output side are integrally configured. However, in the control devices, configurations (software and hardware) which control the operation of each control target device configure the control device of each control target device. For example, in the present embodiment, a configuration which controls the operation of the compressor 11, configures a discharge capacity control device. Further, the configuration for controlling the operation of the liquid pump 15 configures a pumping capacity control device.

Next, the operation of the present embodiment configured as described above will be described with reference to a Mollier diagram of FIG. 4 and an illustration of FIG. 5. Meanwhile, FIG. 5 is an illustrative diagram showing changes in the pressure and the flow rate of the refrigerant in each portion in the liquid ejector 12. First, when an operation switch of the operation panel is turned on (on), the control device actuates the compressor 11, the cooling fan 13a, the liquid pump 15, the blower fan 17a, and so on.

Figure 4:
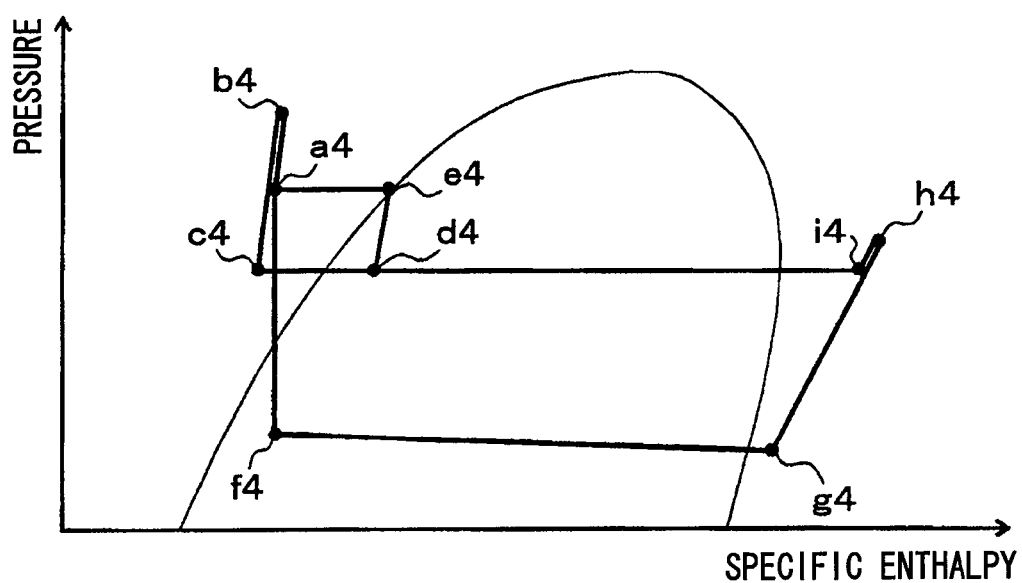
FIG. 4 is a Mollier diagram illustrating a change in a state of a refrigerant in the ejector refrigeration cycle according to the first embodiment.
Figure 5:
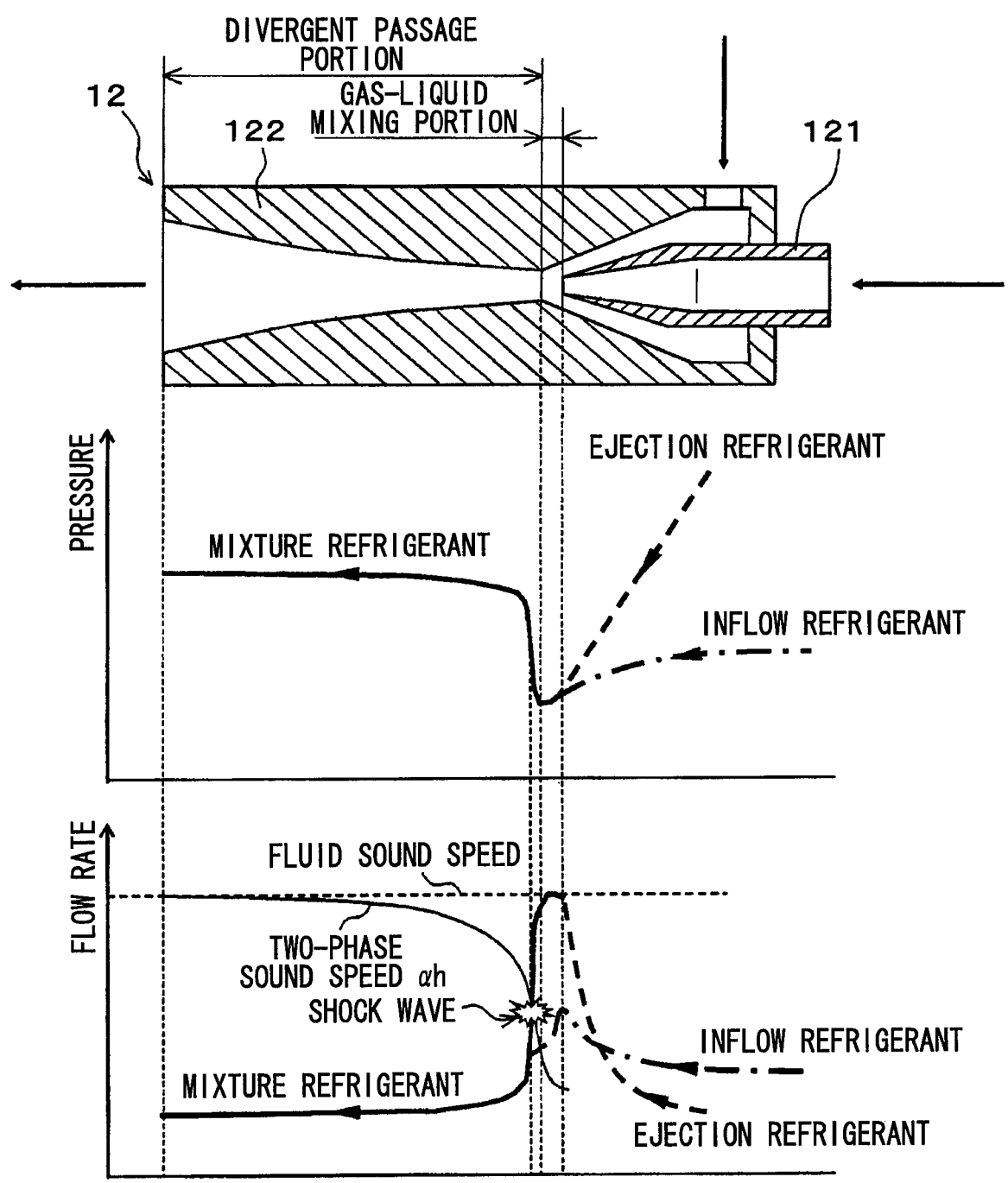
FIG. 5 is a diagram illustrating a pressure change and a flow rate change of a refrigerant in the liquid ejector according to the first embodiment.

With the above configuration, the liquid pump 15 suctions the liquid-phase refrigerant (point a4 in FIG. 4) flowing out of one liquid-phase refrigerant outflow port of the liquid receiver 14 and pumps the liquid-phase refrigerant to the driving refrigerant inflow port 122b side of the liquid ejector 12 (from point a4 to point b4 in FIG. 4). The liquid-phase refrigerant that has flowed into the liquid ejector 12 from the driving refrigerant inflow port 122b is reduced in pressure isentropically in the ejection refrigerant passage 122a and is ejected from the refrigerant ejection port 122c to the gas-liquid mixing portion 122d (from point b4 to point c4 in FIG. 4).

In addition, the compressor 11 suctions the gas-phase refrigerant (point g4 in FIG. 4) flowing out of the low-pressure evaporator 17 and discharges the gas phase refrigerant to the refrigerant inflow port 121b side of the liquid ejector 12 (from point g4 to point h4 in FIG. 4). The gas-phase refrigerant that has flowed into the liquid ejector 12 from the driving refrigerant inflow port 122b is reduced in pressure in the inflow refrigerant passage 121a and flows from the refrigerant outflow port 121c to the gas-liquid mixing portion 122d (point i4 in FIG. 4).

In this situation, as illustrated in FIG. 5, the ejection refrigerant in the liquid-phase state which is ejected from the refrigerant ejection port 122c to the gas-liquid mixing portion 122d is accelerated to be equal to or higher than the fluid sound speed or to the same level as the fluid sound speed. Further, the ejection refrigerant is ejected on the outer circumferential side of the inflow refrigerant flowing into the gas-liquid mixing portion 122d from the refrigerant outflow port 121c.

In the gas-liquid mixing portion 122d, the ejection refrigerant in the liquid-phase state which has been ejected from the refrigerant ejection port 122c and the inflow refrigerant in the gas-phase state which has flowed in through the refrigerant inflow port 121b are mixed together (from point c4 to point d4 and from point i4 to point d4 in FIG. 4). Furthermore, as illustrated in FIG. 5, the mixture refrigerant of the ejection refrigerant and the inflow refrigerant decreases the flow rate as the mixing of the ejection refrigerant and the inflow refrigerant progresses. The flow rate of the mixture refrigerant in the gas-liquid two-phase state falls below the two-phase sound speed αh.

In this example, the two-phase sound speed αh is a sound speed of the fluid in the gas-liquid mixed state in which the gas-phase fluid and the liquid-phase fluid are mixed together, and is defined by the following Formula F1.

$$\alpha h = [P/\{\alpha \times (1-\alpha) \times \rho L\}]^{0.5} \quad (F1)$$

Incidentally, α in Formula F1 is a void fraction and indicates a capacity ratio of voids (air bubbles) contained per unit volume. In detail, the void fraction α is defined by the following formula F2.

$$\alpha = x/\{x + (\rho G/\rho L) \times (1-x)\} \quad (F2)$$

In addition, ρG in Formulae F1, F2 is gas-phase fluid density, ρL is liquid-phase fluid density, and P is pressure of the two-phase fluid.

Further, the shock wave is generated when a flow rate of the mixture refrigerant in a gas-liquid two-phase state is shifted from a two-phase sound speed ah or higher (supersonic speed state) to a lower value than the two-phase sound speed ah (subsonic speed state). In the liquid ejector 12 according to the present embodiment, the pressure of the mixture refrigerant is increased due to the action of the shock wave and the gas-phase refrigerant in the mixture refrigerant is condensed (from point d4 to point e4 in FIG. 4).

With the above condensation, at least the refrigerant flowing out of the divergent passage portion 122e of the liquid ejector 12 is put into a liquid-phase state or a gas-liquid two-phase state with extremely low dryness. That is, in the liquid ejector 12 according to the present embodiment, since the refrigerant that has flowed out of the divergent passage portion 122e is put into the liquid-phase state or the gas-liquid two-phase state with extremely low dryness, the shock wave is propagated to the liquid-phase refrigerant on a downstream side of the liquid ejector 12 as for water hammering.

In the ejector refrigeration cycle 10, the shock wave is continuously generated with the result that the pressure of the inflow refrigerant (that is, the discharged refrigerant from the compressor 11) is lower than the pressure of the liquid-phase refrigerant on the downstream side of the liquid ejector 12 to perform balancing. The shock wave is generated when the gas-phase refrigerant in the mixture refrigerant condenses, and therefore sometimes may be called a condensed shock wave.

The refrigerant that has flowed out of the divergent passage portion 122e of the liquid ejector 12 flows into the radiator 13. The liquid-phase refrigerant that has flowed into the radiator 13 exchanges the heat with the outside air blown by the cooling fan 13a to further lower the enthalpy (from a point e4 to a point a4 in FIG. 4). The subcooled liquid-phase refrigerant that has flowed out of the radiator 13 is stored in the liquid receiver 14.

The refrigerant that has flowed out of the other liquid-phase refrigerant outflow port of the liquid receiver 14 flows into the expansion valve 16 and the pressure of the refrigerant is reduced until the refrigerant becomes a low-pressure refrigerant (from a point a4 to a point f4 in FIG. 4). In this situation, the valve opening degree of the expansion valve 16 is adjusted so that the degree of superheat of the refrigerant on the outlet side of the low-pressure evaporator 17 (point g4 in FIG. 4) comes closer to a predetermined reference superheat degree.

The low-pressure refrigerant flowing out of the expansion valve 16 flows into the low-pressure evaporator 17. The refrigerant that has flowed into the low-pressure evaporator 17 absorbs the heat from the blown air blown by the blower fan 17a, and evaporates (from point f4 to point g4 in FIG. 4). Accordingly, the blown air blown into the vehicle compartment is cooled. The refrigerant that has flowed out from the low-pressure evaporator 17 is drawn into the compressor 11 and is compressed again (from point g4 to point h4 in FIG. 4).

The ejector refrigeration cycle 10 according to the present embodiment operates as described above, and can cool the blown air to be blown into the vehicle compartment by the low-pressure evaporator 17. Further, according to the liquid ejector 12 of the present embodiment, the pressure of the discharged refrigerant from the compressor 11 can be set to be lower than the pressure of the liquid-phase refrigerant on the downstream side of the liquid ejector 12 by the condensed shock wave described above.

Therefore, in the ejector refrigeration cycle 10 according to the present embodiment, as compared with the normal refrigeration cycle device in which the pressure of the refrigerant discharged from the compressor 11 and the pressure of the refrigerant flowing into the radiator 13 are substantially equal to each other, the discharged refrigerant pressure of the compressor 11 (refrigerant discharge capacity) can be reduced. As a result, the coefficient of performance (COP) of the cycle can be improved.

Further, in the liquid ejector 12 according to the present embodiment, the refrigerant ejection port 122c of the ejection refrigerant passage 122a is formed into an annular shape, and the refrigerant outflow port 121c of the inflow passage forming portion 121 is disposed on an inner circumferential side of the ejection refrigerant passage 122a. This makes it possible to easily set the hydraulic diameter of the refrigerant outflow port 121c to be smaller than the hydraulic diameter of the refrigerant ejection port 122c.

As the inflow passage forming portion 121, substantially the same component as the nozzle (convergent nozzle in the present embodiment) can be employed. Therefore, a flow rate of the inflow refrigerant flowing into the gas-liquid mixing portion 122d from the refrigerant outflow port 121c can be increased in comparison with the case where the refrigerant outflow port 121c is formed in an annular shape and the refrigerant ejection port 122c is disposed on the inner circumferential side of the refrigerant outflow port 121c.

With an increase in the flow rate of the inflow refrigerant as described above, a contact area between the ejection refrigerant and the inflow refrigerant per unit time in the gas-liquid mixing portion 122d can be increased, and the ejection refrigerant and the inflow refrigerant are easily mixed together in the gas-liquid mixing portion 122d. Therefore, the mixture refrigerant of the ejection refrigerant and the inflow refrigerant can be brought closer to an ideal gas-liquid mixed state in which the fine particles of the gas-phase refrigerant are homogeneously mixed in the liquid-phase refrigerant in the gas-liquid mixing portion 122d.

With the mixture refrigerant in the ideal gas-liquid mixed state, a condensation delay of the gas-phase refrigerant can be suppressed, and an energy loss such as a wall surface viscosity loss caused by a friction between the mixture refrigerant and the wall surface of the gas-liquid mixing portion 122d as well as a friction between the mixture refrigerant and a wall surface of the divergent passage portion 122e can be reduced. As a result in the present embodiment, the ejector efficiency of the liquid ejector 12 can be efficiently improved.

Further, since a pressure increase amount (a pressure difference between a point d4 and a point e4 in FIG. 4) of the refrigerant in the liquid ejector 12 can be increased with an increase in the ejector efficiency of the liquid ejector 12, the discharged refrigerant pressure (a pressure at a point h4 in FIG. 4) of the compressor 11 can be lowered. As a result, the power consumption of the compressor 11 can be reduced, and the COP of the cycle can be further improved.

Further, in the ejector refrigeration cycle 10 according to the present embodiment, the radiator 13 is disposed on the outlet side of the divergent passage portion 122e of the liquid ejector 12. Therefore, even if an entropy formation caused by the condensed shock wave occurs, the entropy can be absorbed by heat radiation in the radiator 13. For that reason, the entropy generated by the condensed shock wave does not affect the endothermic amount of the refrigerant in the low-pressure evaporator 17, and the COP of the cycle is not lowered.

Second Embodiment

In the present embodiment, as compared with the first embodiment, as illustrated in the overall configuration diagram of FIG. 6, an ejector refrigeration cycle 10a adding a high-pressure liquid pump 18, a high-pressure evaporator 19, a high-pressure ejector 20 and the like will be described.

More specifically, a liquid receiver 14 of an ejector refrigeration cycle 10a according to the present embodiment is provided with another liquid-phase refrigerant outflow port in addition to the first embodiment. In other words, the liquid receiver 14 of the present embodiment is equipped with three liquid-phase refrigerant outflow ports in total. The another liquid-phase refrigerant outflow port is connected with an intake side of a high-pressure liquid pump 18.

The high-pressure liquid pump 18 is a high-pressure pumping device for pumping the liquid-phase refrigerant flowing out of the liquid receiver 14 to a refrigerant inflow port side of a high-pressure evaporator 19. A basic configuration of the high-pressure liquid pump 18 is the same as that of the liquid pump 15. Therefore, the high-pressure liquid pump 18 is an electric type water pump whose rotational speed (liquid feed refrigerant pumping amount) is controlled by a controlled voltage output from a control device.

The refrigerant inflow port side of the high-pressure evaporator 19 is connected to the refrigerant outlet side of the high-pressure liquid pump 18 through a check valve 18a. The check valve 18a allows only the refrigerant to flow from the refrigerant outlet side of the high-pressure liquid pump 18 to the refrigerant inflow port side of the high-pressure evaporator 19. The high-pressure evaporator 19 is a water-refrigerant heat exchanger that superheats and vaporizes the liquid-phase refrigerant using an engine coolant water not shown which outputs a driving force for driving a vehicle as a heat source.

As such a high-pressure evaporator 19, it is possible to employ a double pipe structure in which a refrigerant passage is disposed inside of a coolant passage so as to exchange heat between the coolant and the refrigerant, a structure in which with the use of a meandering tube or multiple linear tubes as a refrigerant passage, a coolant passage is provided between the adjacent tubes to perform a heat exchange between the coolant water and the refrigerant, or the like.

The inlet side of a high-pressure nozzle portion 20a of a high-pressure ejector 20 is connected to the refrigerant outflow port of the high-pressure evaporator 19. The high-pressure ejector 20 is a refrigerant circulating device (refrigerant transport device) that ejects the gas-phase refrigerant flowing out of the high-pressure evaporator 19 from the high-pressure nozzle portion 20a and suctions (transports) the discharged refrigerant of a compressor 11 by a suction action of the high-pressure ejection refrigerant ejected at a high speed to circulate the refrigerant in the cycle (refrigerant transport device).

More specifically, the high-pressure ejector 20 according to the present embodiment has the high-pressure nozzle portion 20a and the high-pressure body portion 20b. The high-pressure nozzle portion 20a is formed of a substantially cylindrical metal (for example, stainless steel alloy) or the like that is gradually tapered toward a refrigerant flowing direction, and reduces the pressure and expands the refrigerant in an isentropic manner in a refrigerant passage (throttle passage) defined on the inside of the nozzle portion 20a.

Further, in the present embodiment, in the high-pressure nozzle portion 20a, a flow rate of the high-pressure ejection refrigerant ejected from the refrigerant ejection port is set to be equal to or higher than a sound speed during normal operation of the ejector refrigeration cycle 10. The high-pressure nozzle portion 20a may be configured by any of a Laval nozzle and a convergent nozzle.

The high-pressure body portion 20b is made of metal (for example, aluminum) or resin formed into substantially a cylindrical shape, functions as a fixing member for internally supporting and fixing the high-pressure nozzle portion 20a, and forms an outer shell of the high-pressure ejector 20. More specifically, the high-pressure nozzle portion 20a is fixed by press fitting so as to be housed in the interior of one end side in the longitudinal direction of the high-pressure body portion 20b.

A portion corresponding to an outer circumferential side of the high-pressure nozzle portion 20a in an outer circumferential surface of the high-pressure body portion 20b is formed with a high-pressure refrigerant suction port 20c that is provided to penetrate through the high-pressure body portion 20b and communicate with the refrigerant ejection port of the high-pressure nozzle portion 20a. The high-pressure refrigerant suction port 20c is a through hole for suctioning the refrigerant that has been discharged from the compressor 11 into the interior of the high-pressure ejector 20 due to the suction action of the high-pressure ejection refrigerant ejected from the high-pressure nozzle portion 20a.

The interior of the high-pressure body portion 20b is formed with a suctioning passage and a high-pressure diffuser portion 20d serving as a high-pressure pressurizing portion. The suctioning passage is provided for introducing the drawn refrigerant drawn from the high-pressure refrigerant suction port 20c to the refrigerant ejection port side of the high-pressure nozzle portion 20a. The high-pressure diffuser portion 20d mixes the high-pressure drawn refrigerant that has flowed into the high-pressure ejector 20 from the high-pressure refrigerant suction port 20c through the suction passage with the high-pressure ejection refrigerant to increase the pressure.

The high-pressure diffuser portion 20d is disposed to be continuous to an outlet of the suctioning passage, and formed by a space that gradually increases a refrigerant passage area. With the above configuration, the high-pressure diffuser portion 20d performs a function of increasing a pressure of the mixture refrigerant of the high-pressure ejection refrigerant and the high-pressure drawn refrigerant by decreasing the flow rate of the refrigerants while the high-pressure ejection refrigerant is mixed with the high-pressure drawn refrigerant, that is, a function of converting a velocity energy of the mixture refrigerant into a pressure energy.

In the ejector refrigeration cycle 10a of the present embodiment, a refrigerant inflow port 121b of the liquid ejector 12 is connected to the outlet side of the high-pressure diffuser portion 20d of the high-pressure ejector 20. Therefore, the refrigerant discharged from the compressor 11 flows into the refrigerant inflow port 121b of the liquid ejector 12 of the present embodiment through the high-pressure ejector 20. The other configuration of the ejector refrigeration cycle 10a is identical with that of the ejector refrigeration cycle 10 in the first embodiment.

Figure 7:
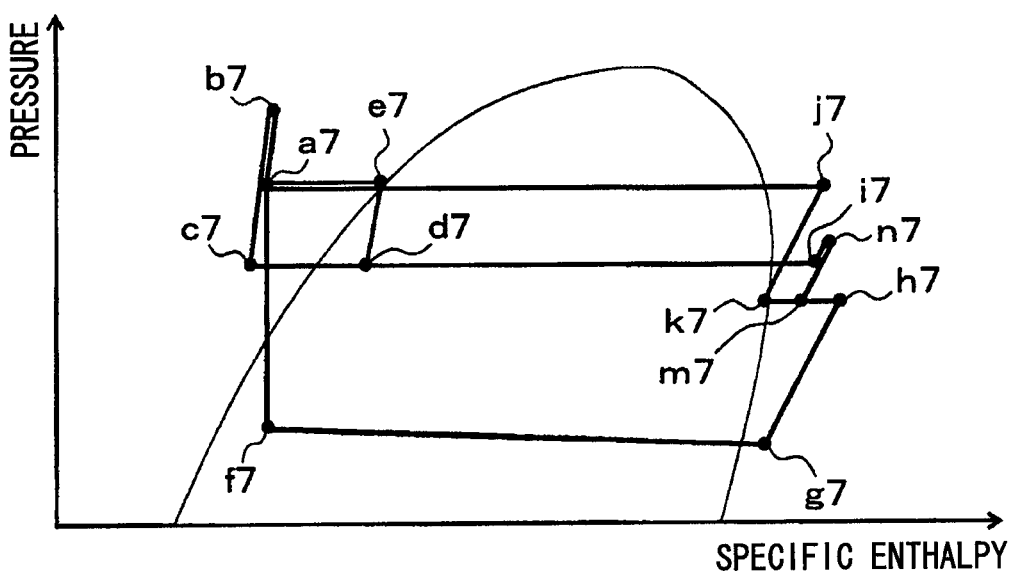
FIG. 7 is a Mollier diagram illustrating a change in a state of a refrigerant in the ejector refrigeration cycle according to the second embodiment.

Next, the operation of the present embodiment configured as described above will be described with reference to a Mollier diagram of FIG. 7. Each symbol indicating the state of the refrigerant in the Mollier diagram of FIG. 7 is denoted by the same alphabet if the symbol represents the state of the refrigerant in the same place in the cycle configuration in the Mollier diagram of FIG. 4 explained in the first embodiment, and only subscript (numeral) is changed. The same is applied to the following Mollier diagram.

In the present embodiment, when the operation switch of the operation panel is turned on (ON), the control device actuates the high-pressure liquid pump 18 in addition to the electric motor of the compressor 11, the cooling fan 13a, the liquid pump 15, and the blower fan 17a.

With the above configuration, the high-pressure liquid pump 18 suctions the liquid-phase refrigerant (point a7 in FIG. 7) that has flowed out of another liquid-phase refrigerant outflow port of the liquid receiver 14 and pumps the liquid-phase refrigerant to the refrigerant passage of the high-pressure evaporator 19. The refrigerant that has flowed into the high-pressure evaporator 19 absorbs a heat from the engine coolant water flowing through the coolant passage and evaporates (from a point a7 to a point j7 in FIG. 7). The gas-phase refrigerant flowing out of the high-pressure evaporator 19 flows into the high-pressure nozzle portion 20a of the high-pressure ejector 20.

The refrigerant that has flowed into the high-pressure nozzle portion 20a is isentropically reduced in pressure and ejected (from a point j7 to a point k7 in FIG. 7). The refrigerant discharged from the compressor 11 is drawn from the high-pressure refrigerant suction port 20c of the high-pressure ejector 20 due to the suction action of the high-pressure ejection refrigerant ejected from the high-pressure nozzle portion 20a.

Further, the high-pressure ejection refrigerant ejected from the high-pressure nozzle portion 20a and the high-pressure drawn refrigerant drawn from the high-pressure refrigerant suction port 20c flow into a high-pressure diffuser portion 20d (from a point k7 to a point m7 and from a point h7 to a point m7 in FIG. 7). In the high-pressure diffuser portion 20d, the velocity energy of the mixture refrigerant of the high-pressure ejection refrigerant and the high-pressure drawn refrigerant is converted into the pressure energy due to the increase in the refrigerant passage area. As a result, a pressure of the mixture refrigerants of the high-pressure ejection refrigerant and the high-pressure drawn refrigerant increases (from point m7 to point n7 in FIG. 7).

The refrigerant that has flowed out of the high-pressure diffuser portion 20d flows from the refrigerant inflow port 121b of the liquid ejector 12 into an inflow refrigerant passage 121a. In other words, a mixed gas-phase refrigerant of the gas-phase refrigerant discharged from the compressor 11 and the gas-phase refrigerant flowing out of the high-pressure evaporator 19 flows into a refrigerant inflow port 121b of the liquid ejector 12 of the present embodiment. The other operation is the same as that in the first embodiment.

Therefore, when the ejector refrigeration cycle 10a according to the present embodiment operates, the blown air to be blown into the vehicle compartment can be cooled by the low-pressure evaporator 17 as in the ejector refrigeration cycle 10 of the first embodiment. Further, with a sufficient improvement in the ejector efficiency of the liquid ejector 12, the COP of the cycle can be improved.

In addition to the above configuration, since the ejector refrigeration cycle 10a according to the present embodiment is equipped with the high-pressure ejector 20, the discharged refrigerant pressure from the compressor 11 (a pressure at a point h7 in FIG. 7) can be reduced due to a pressure increasing action of the high-pressure ejector 20. As a result, the power consumption of the compressor 11 can be reduced, and the COP of the cycle can be further improved.

Further, since the ejector refrigeration cycle 10a includes the high-pressure evaporator 19, the refrigerant can flow into the high-pressure nozzle portion 20a of the high-pressure ejector 20 with the use of an engine exhaust heat. In other words, the refrigerant can flow into the refrigerant inflow port 121b of the liquid ejector 12 with the use of the exhaust heat of the engine.

This makes it possible to reduce the refrigerant discharge capacity (specifically, discharge flow rate) of the compressor 11. Therefore, the COP of the cycle can be further improved.

Figure 6:
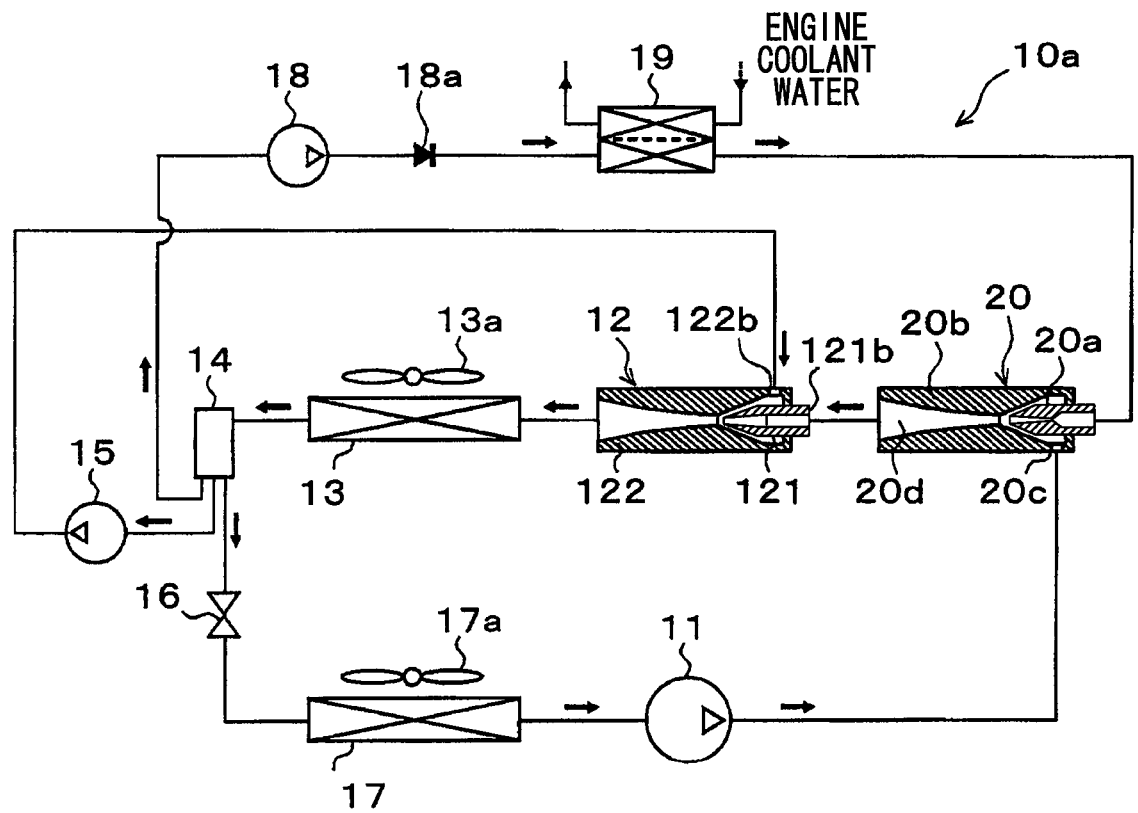
FIG. 6 is a schematic diagram illustrating an ejector refrigeration cycle according to a second embodiment of the present disclosure.

In this example, as illustrated in FIG. 6, a specific configuration of the high-pressure ejector 20 and a specific configuration of the liquid ejector 12 are extremely similar to each other. For example, the high-pressure nozzle portion 20a and the high-pressure body portion 20b of the high-pressure ejector 20 are configured to be similar to the inflow passage forming portion 121 and the liquid ejection body portion 122 of the liquid ejector 12, respectively.

However, the high-pressure ejector 20 is configured as a single-phase flow ejector that mixes the high-pressure ejection refrigerant of the gas-phase state ejected from the high-pressure nozzle portion 20a and the high-pressure drawn refrigerant in the gas-phase state drawn from the high-pressure refrigerant suction port 20c, and increases the pressure of the mixture refrigerant of the gas-phase state in the high-pressure diffuser portion 20d. For that reason, the high-pressure ejector 20 and the liquid ejector 12 increase the pressure of the refrigerant with completely different operation mechanisms.

Third Embodiment

In the present embodiment, as illustrated in an overall configuration diagram of FIG. 8, an ejector refrigeration cycle 10b in which a low-pressure ejector 21, a gas-liquid separator 22, a fixed throttle 23 and the like are added to the first embodiment will be described.

More specifically, an inlet side of a low-pressure nozzle portion 21a of the low-pressure ejector 21 is connected to the other refrigerant outflow port of a liquid receiver 14 of the ejector refrigeration cycle 10b. The low-pressure ejector 21 is a refrigerant circulating device (refrigerant transport device) that decompresses and discharges a refrigerant of a liquid-phase state which has flowed out of the liquid receiver 14 until the refrigerant puts into a gas-liquid two-phase state, suctions (transports) the refrigerant flowing out of a low-pressure evaporator 17 due to a suction action of the low-pressure ejection refrigerant ejected at a high speed and circulates the refrigerant in the cycle.

A basic configuration of the low-pressure ejector 21 is the same as that of the high-pressure ejector 20. More specifically, the low-pressure ejector 21 according to the present embodiment has the low-pressure nozzle portion 21a and the low-pressure body portion 21b.

A low-pressure body portion 21b is equipped with a low-pressure refrigerant suction port 21c for drawing the refrigerant that has flowed out of the low-pressure evaporator 17 and a low-pressure diffuser portion 21d as a low-pressure pressurizing portion for increasing a pressure of a mixture refrigerant of a low-pressure ejection refrigerant ejected from the low-pressure nozzle portion 21a and a low-pressure drawn refrigerant drawn from the low-pressure refrigerant suction port 21c.

The outlet side of the low-pressure diffuser portion 21d is connected with the inlet side of the gas-liquid separator 22. The gas-liquid separator 22 is a gas-liquid separation device that separates the refrigerant that has flowed out of the low-pressure diffuser portion 21d into gas and liquid. Further, in the present embodiment, the gas-liquid separator 22 is relatively small in an internal capacity so as to allow the separated liquid-phase refrigerant to flow out of the liquid-phase refrigerant outflow port without almost storing the liquid-phase refrigerant.

The gas-phase refrigerant outflow port of the gas-liquid separator 22 is connected with an intake side of the compressor 11. The liquid-phase refrigerant outflow port of the gas-liquid separator 22 is connected with a refrigerant inlet side of the low-pressure evaporator 17 through a fixed throttle 23 as a depressurizing device. The fixed throttle 23 can be exemplified by an orifice or a capillary tube.

A refrigerant outlet side of the low-pressure evaporator 17 is connected with the low-pressure refrigerant suction port 21c side of the low-pressure ejector 21. The other configuration of the ejector refrigeration cycle 10b is identical with that of the ejector refrigeration cycle 10 in the first embodiment.

Next, the operation of the present embodiment configured as described above will be described with reference to a Mollier diagram of FIG. 9. In the ejector refrigeration cycle 10b of the present embodiment, a control device actuates an electric motor of a compressor 11, a liquid pump 15, and the like.

As a result, the refrigerant that has flowed out of the other liquid-phase refrigerant outflow port of the liquid receiver 14 flows into the low-pressure nozzle portion 21a of the low-pressure ejector 21. The refrigerant that has flowed into the low-pressure nozzle portion 21a is reduced in pressure isentropically and ejected (from a point a9 to a point f9 in FIG. 9). The refrigerant that has flowed out of the low-pressure evaporator 17 is drawn into the low-pressure ejector 21 from the low-pressure refrigerant suction port 21c due to the suction action of the low-pressure ejection refrigerant which has been ejected from the low-pressure nozzle portion 21a.

Figure 9:
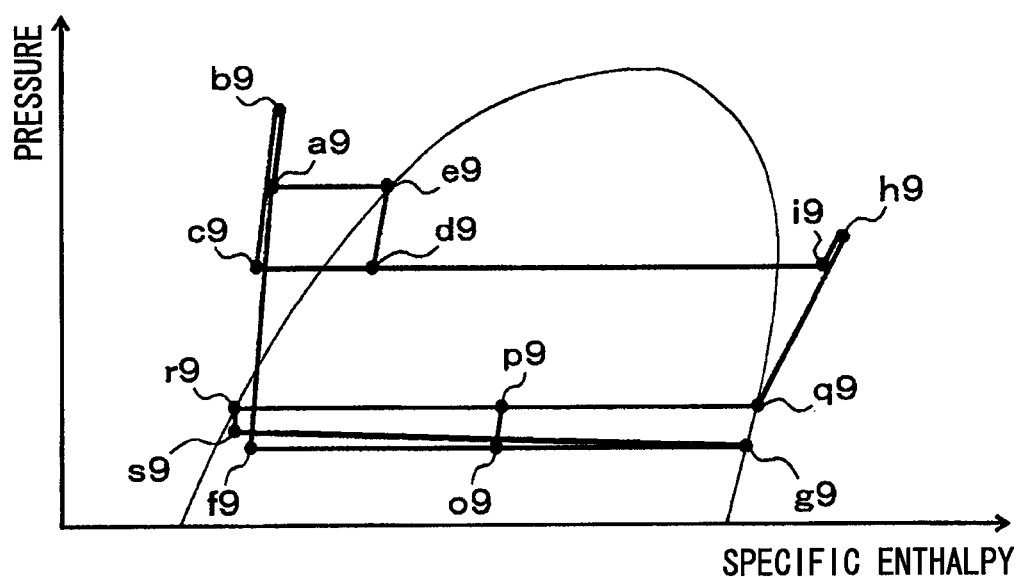
FIG. 9 is a Mollier diagram illustrating a change in a state of a refrigerant in the ejector refrigeration cycle according to the third embodiment.

Further, the low-pressure ejection refrigerant ejected from the low-pressure nozzle portion 21a and the low-pressure drawn refrigerant drawn from the low-pressure refrigerant suction port 21c flow into the low-pressure diffuser portion 21d (from a point f9 to a point o9 and from a point g9 to a point o9 in FIG. 9). In the low-pressure diffuser portion 21d, the velocity energy of the mixture refrigerant of the low-pressure ejection refrigerant and the low-pressure drawn refrigerant is converted into the pressure energy due to the increase in the refrigerant passage area. As a result, a pressure of the mixture refrigerants of the low-pressure ejection refrigerant and the low-pressure drawn refrigerant increases (from point o9 to point p9 in FIG. 9).

The refrigerant that has flowed out of the low-pressure diffuser portion 21d flows into the gas-liquid separator 22 and is separated into the gas and the liquid (from point p9 to point q9, from point p9 to point r9 in FIG. 9). The liquid-phase refrigerant that has been separated by the gas-liquid separator 22 is reduced in pressure by the fixed throttle 23 in an isenthalpic manner, and flows into the low-pressure evaporator 17 (from point r9 to point s9 in FIG. 9).

The refrigerant that flowed into the low-pressure evaporator 17 absorbs the heat from the blown air blown by the blower fan 17a, and evaporates (from point s9 to point g9 in FIG. 9). Accordingly, the blown air blown into the vehicle compartment is cooled. The refrigerant that has flowed out of the low-pressure evaporator 17 is drawn from the low-pressure refrigerant suction port 21c. On the other hand, the gas-phase refrigerant separated by the gas-liquid separator 22 is absorbed by the compressor 11, and again compressed (from point q9 to point h9 in FIG. 9). The other operation is the same as that in the first embodiment.

Therefore, when the ejector refrigeration cycle 10b according to the present embodiment operates, the blown air to be blown into the vehicle compartment can be cooled by the low-pressure evaporator 17 as in the ejector refrigeration cycle 10 of the first embodiment. Further, with a sufficient improvement in the ejector efficiency of the liquid ejector 12, the COP of the cycle can be improved.

In addition, since the ejector refrigeration cycle 10b includes the low-pressure ejector 21, the intake refrigerant pressure (a point q9 in FIG. 9) of the compressor 11 can be increased due to the pressure increasing action of the low-pressure ejector 21. As a result, a power consumption of the compressor 11 can be reduced, and the COP of the cycle can be further improved.

Figure 8:
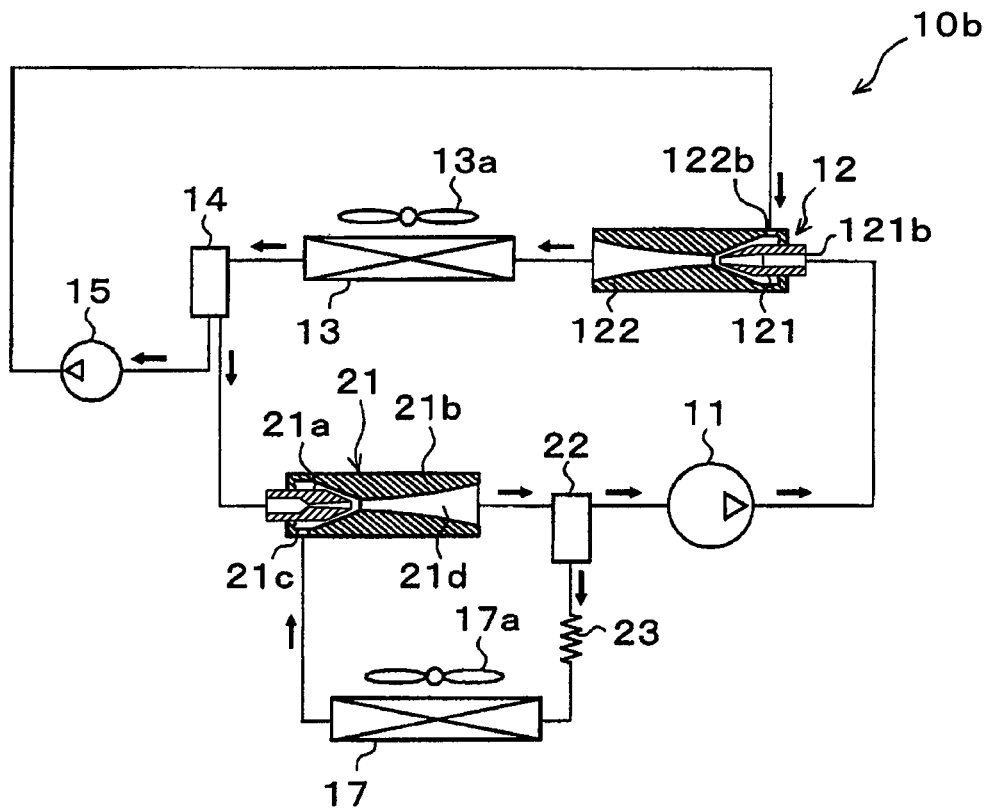
FIG. 8 is a schematic diagram illustrating an ejector refrigeration cycle according to a third embodiment of the present disclosure.

In this example, as illustrated in FIG. 8, a specific configuration of the low-pressure ejector 21 and a specific configuration of the liquid ejector 12 are extremely similar to each other. For example, the low-pressure nozzle portion 21a and the low-pressure body portion 21b of the low-pressure ejector 21 are configured to be similar to the inflow passage forming portion 121 and the liquid ejection body portion 122 of the liquid ejector 12, respectively.

However, the low-pressure ejector 21 is configured as a two-phase flow ejector that mixes the low-pressure ejection refrigerant in the gas-liquid two-phase state ejected from the low-pressure nozzle portion 21a with the low-pressure drawn refrigerant of the gas-phase state drawn from the low-pressure refrigerant suction port 21c to increase the pressure of the mixture refrigerant of the gas-liquid two-phase state in the low-pressure diffuser portion 21d. For that reason, the low-pressure ejector 21 and the liquid ejector 12 increase the pressure of the refrigerant with completely different operation mechanisms.

Fourth Embodiment

Figure 10:
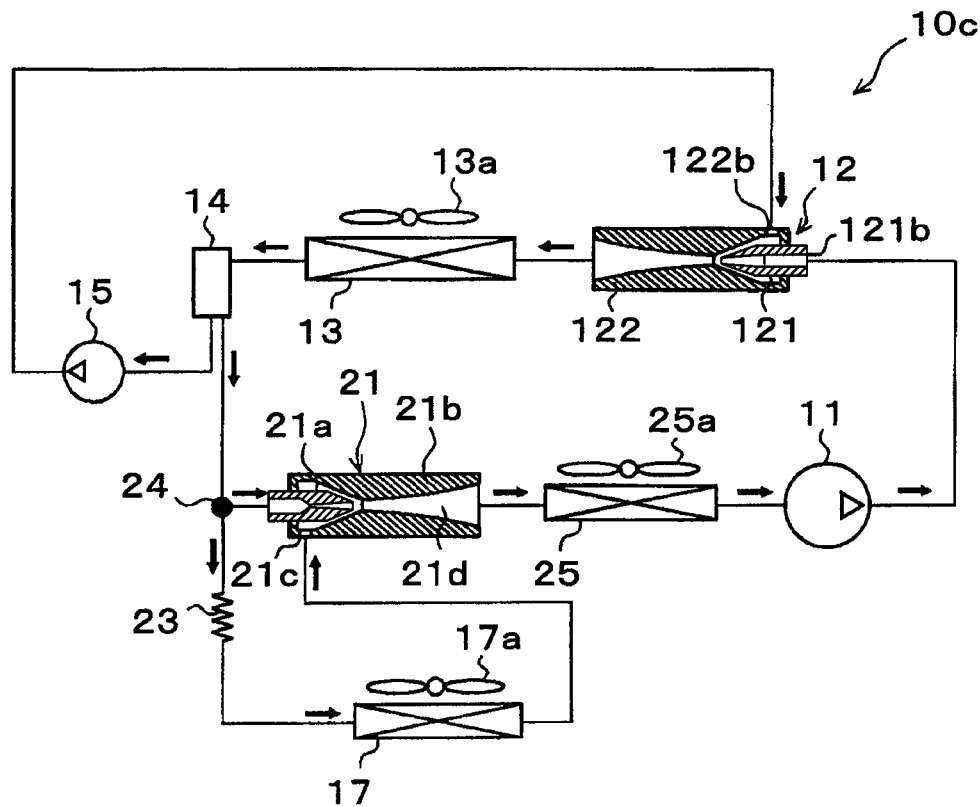
FIG. 10 is a schematic diagram illustrating an ejector refrigeration cycle according to a fourth embodiment of the present disclosure.

In the present embodiment, as illustrated in an overall configuration diagram of FIG. 10, an ejector refrigeration cycle 10c in which a branch portion 24, a low-pressure ejector 21, a second low-pressure evaporator 25, and so on are added to the first embodiment will be described.

More specifically, a refrigerant inflow port of the branch portion 24 is connected to the other refrigerant outflow port of a liquid receiver 14 of the ejector refrigeration cycle 10c. The branch portion 24 has a three-way joint structure for branching of a flow of a subcooled liquid-phase refrigerant flowing out of the liquid receiver 14. In more detail, in the branch portion 24, one of three refrigerant inflow and outflow ports is used as the refrigerant inflow port, and the remaining two ports are used as the refrigerant outflow ports.

An inlet side of a low-pressure nozzle portion 21a of the low-pressure ejector 21 is connected to one of the refrigerant outflow ports of the branch portion 24. A refrigerant inlet side of a low-pressure evaporator 17 is connected to the other refrigerant outflow port of the branch portion 24 through a fixed throttle 23. Furthermore, in the present embodiment, a refrigerant inlet side of the second low-pressure evaporator 25 is connected to an outlet side of a low-pressure diffuser portion 21d of the low-pressure ejector 21.

A basic configuration of the second low-pressure evaporator 25 is identical with that of the low-pressure evaporator 17. The second low-pressure evaporator 25 is a heat-absorbing heat exchanger that exchanges the heat between the low-pressure refrigerant flowing out of the low-pressure diffuser portion 21d of the low-pressure ejector 21 and the blown air that is blown into the vehicle compartment from the blower fan 25a, to thereby evaporate the low-pressure refrigerant and exert the heat absorbing effect.

Furthermore, in a vehicle air conditioning apparatus of the present embodiment, a blown air blown to a front seat side of a vehicle by the low-pressure evaporator 17 is cooled and a blown air blown to a vehicle rear seat side by the second low-pressure evaporator 25 is cooled. In other words, the vehicle air conditioning apparatus according to the present embodiment is configured as a so-called dual air conditioner. In the following description of the present embodiment, the low-pressure evaporator 17 will be referred to as a first low-pressure evaporator 17 for the sake of clarity of description.

The refrigerant outlet side of the first low-pressure evaporator 17 is connected with the low-pressure refrigerant suction port 21c side of the low-pressure ejector 21. Also, the refrigerant outlet side of the second low-pressure evaporator 25 is connected with the refrigerant intake side of the compressor 11. The other configuration of the ejector refrigeration cycle 10c is identical with that of the ejector refrigeration cycle 10 in the first embodiment.

Next, the operation of the present embodiment configured as described above will be described with reference to a Mollier diagram of FIG. 11. In the ejector refrigeration cycle 10c of the present embodiment, a control device actuates an electric motor of a compressor 11, a liquid pump 15, and the like.

Figure 11:
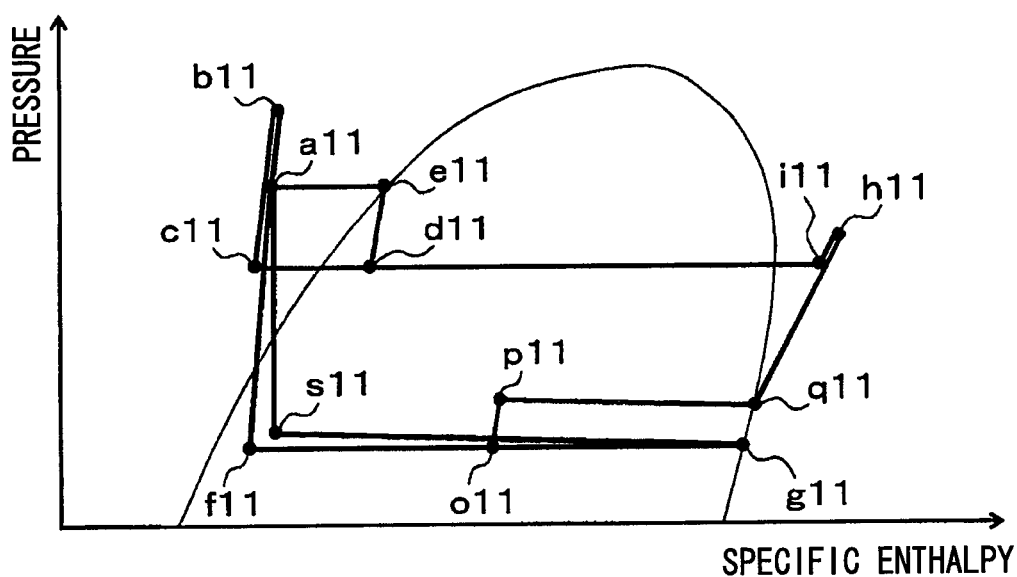
FIG. 11 is a Mollier diagram illustrating a change in a state of a refrigerant in the ejector refrigeration cycle according to the fourth embodiment.

As a result, a refrigerant flowing out of the liquid receiver 14 and being branched at the branch portion 24 flows into the low-pressure nozzle portion 21a of the low-pressure ejector 21 and is isentropically decompressed and ejected (from a point a11 to a point f11 in FIG. 11). The refrigerant (a point g11 in FIG. 11) that has flowed out of the first low-pressure evaporator 17 is drawn into the low-pressure ejector 21 from the low-pressure refrigerant suction port 21c due to the suction action of the low-pressure ejection refrigerant which has been ejected from the low-pressure nozzle portion 21a.

Further, the ejection refrigerant ejected from the low-pressure nozzle portion 21a and the low-pressure drawn refrigerant drawn from the low-pressure refrigerant suction port 21c are merged and boosted at the low-pressure diffuser portion 21d (a point f11, a point o11, and a point p11; a point g11, a point o11, and a point p11 in FIG. 11 in the stated order). The refrigerant that has flowed out of the low-pressure diffuser portion 21d flows into the second low-pressure evaporator 25.

The refrigerant that has flowed into the second low-pressure evaporator 25 absorbs a heat from the blown air blown by a blower fan 25a and evaporates (from a point p11 to a point q11 in FIG. 11). As a result, the blown air blown to the rear seat side of the vehicle is cooled. The refrigerant that has flowed out of the second low-pressure evaporator 25 is drawn into the compressor 11 and compressed again (from a point g11 to a point h11 in FIG. 11).

Another refrigerant branched at the branch portion 24 is reduced in pressure by the fixed throttle 23 (from a point a11 to a point s11 in FIG. 11) and flows into the first low-pressure evaporator 17. The refrigerant that has flowed into the first low-pressure evaporator 17 absorbs the heat from the blown air blown by the blower fan 17a, and evaporates (from a point s11 to a point g11 in FIG. 11). Accordingly, the blown air to be blown to the front seat side of the vehicle is cooled. The refrigerant that has flowed out of the first low-pressure evaporator 17 is drawn from the low-pressure refrigerant suction port 21c. The other operation is the same as that in the first embodiment.

Therefore, when the ejector refrigeration cycle 10c according to the present embodiment is operated, the blown air to be blown toward the front seat side of the vehicle and the blow air to be blown to the rear seat side of the vehicle can be cooled. In this situation, the blown air to be blown to the front seat side of the vehicle and the blow air to be blown to the rear seat side of the vehicle can be cooled at different temperature zones. Further, as in the first embodiment, with a sufficient improvement in the ejector efficiency of the liquid ejector 12, the COP of the cycle can be improved.

In addition, since the ejector refrigeration cycle 10c includes the low-pressure ejector 21, as in the third embodiment, the intake refrigerant pressure (a point q11 in FIG. 11) of the compressor 11 can be increased due to the pressure increasing action of the low-pressure ejector 21. Therefore, the COP of the cycle can be further improved.

Fifth Embodiment

Figure 12:
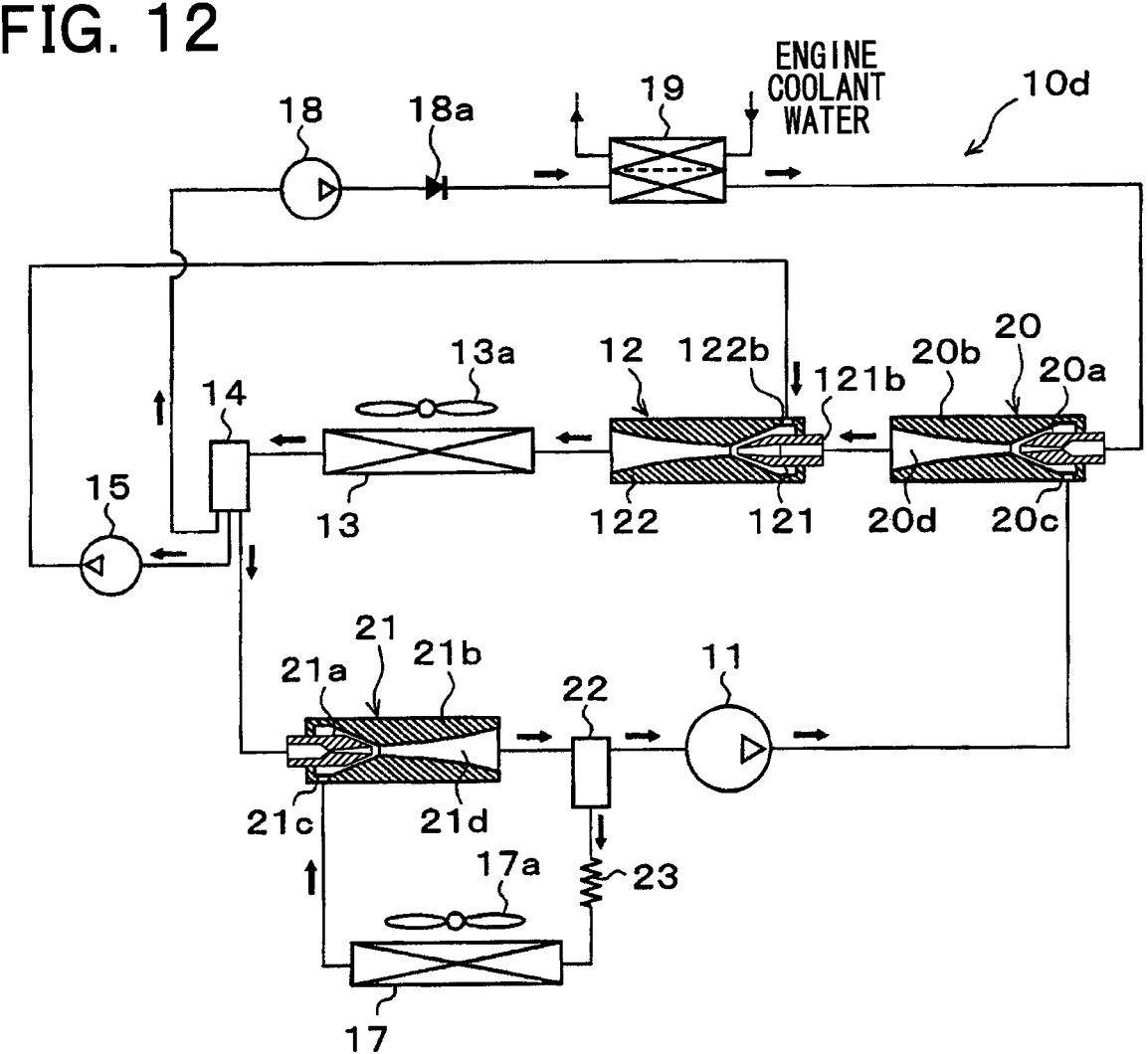
FIG. 12 is a schematic diagram illustrating an ejector refrigeration cycle according to a fifth embodiment of the present disclosure.

In the present embodiment, an ejector refrigeration cycle 10d illustrated in the overall configuration diagram of FIG. 12 will be described. The ejector refrigeration cycle 10d is different from the ejector refrigeration cycle 10a described in the second embodiment in that a low-pressure ejector 21, a gas-liquid separator 22, a fixed throttle 23 and the like are added as in the third embodiment. The other configuration of the ejector refrigeration cycle 10d is identical with that of the ejector refrigeration cycle 10a in the second embodiment.

Figure 13:
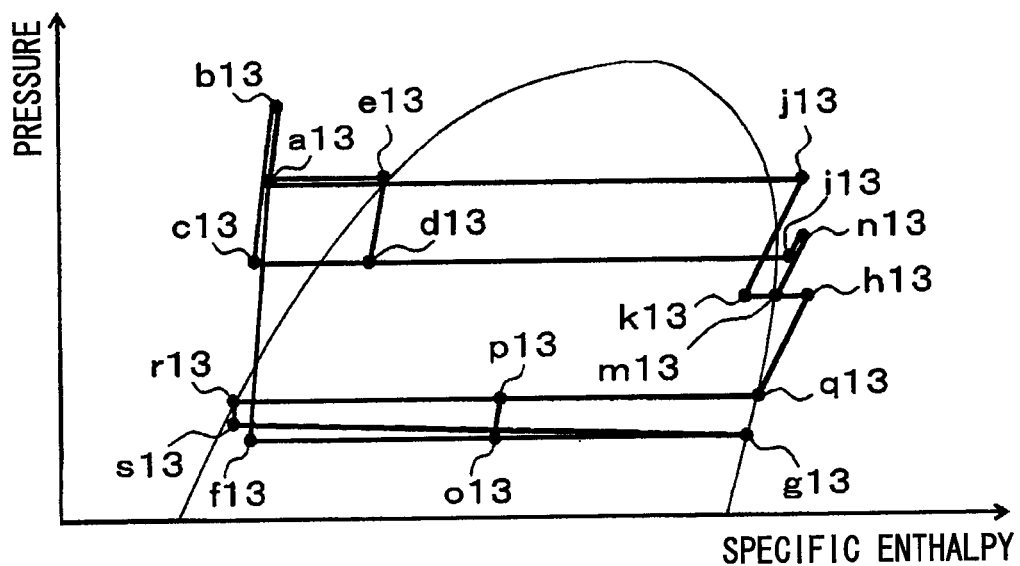
FIG. 13 is a Mollier diagram illustrating a change in a state of a refrigerant in the ejector refrigeration cycle according to the fifth embodiment.

Next, the operation of the present embodiment configured as described above will be described with reference to a Mollier diagram of FIG. 13. The liquid-phase refrigerant that has flowed out from a liquid receiver 14 to a high-pressure liquid pump 18 side flows into a high-pressure nozzle portion 20a of a high-pressure ejector 20 as in the second embodiment. The liquid-phase refrigerant merges with the discharged refrigerant from the compressor 11 drawn from a high-pressure refrigerant suction port 20c and is boosted by a high-pressure diffuser portion 20d (a point k13, a point m13, and a point n13; a point h13, the point m13, and the point n13 in FIG. 13 in the stated order).

On the other hand, the liquid-phase refrigerant that has flowed out from the liquid receiver 14 to the low-pressure ejector 21 side flows into a low-pressure nozzle portion 21a of the low-pressure ejector 21 as in the third embodiment. The liquid-phase refrigerant merges with the refrigerant flowing out of the low-pressure evaporator 17 drawn from the low-pressure refrigerant suction port 21c and is boosted by the low-pressure diffuser portion 21d (a point f13, a point o13, and a point p13; a point g13, the point o13, and the point p13 in FIG. 13 in the stated order). The other operation is the same as that in the second embodiment.

Therefore, when the ejector refrigeration cycle 10d according to the present embodiment operates, the blown air to be blown into the vehicle compartment can be cooled by the low-pressure evaporator 17 as in the ejector refrigeration cycle 10a of the second embodiment. Further, with a sufficient improvement in the ejector efficiency of the liquid ejector 12, the COP of the cycle can be improved.

In addition to the above configuration, according to the ejector refrigeration cycle 10d, since the high-pressure ejector 20 is provided, as in the second embodiment, the discharged refrigerant pressure of a compressor 11 (a pressure at a point h13 in FIG. 13) can be reduced. Furthermore, since the low-pressure ejector 21 is provided, the intake refrigerant pressure (a pressure at a point q13 in FIG. 13) of the third embodiment can be increased.

This makes it possible to greatly reduce the pressure increase amount (consumption power) of the compressor 11, and makes it possible to extremely effectively improve the COP of the cycle.

In the present embodiment, the low-pressure ejector 21 and the like are added to the ejector refrigeration cycle 10a described in the second embodiment as in the third embodiment. On the other hand, similarly to the fourth embodiment, even if the branch portion 24, the low-pressure ejector 21, the second low-pressure evaporator 25 and the like are added to the ejector refrigeration cycle 10a, the COP can be extremely effectively improved as in the present embodiment.

Sixth to Tenth Embodiments

In sixth to tenth embodiments, an example in which the configuration of a liquid ejector 12 is changed will be described. The liquid ejector 12 described in the following embodiments can be applied to any of the ejector refrigeration cycles 10 to 10d described in the above embodiments.

Figure 14:
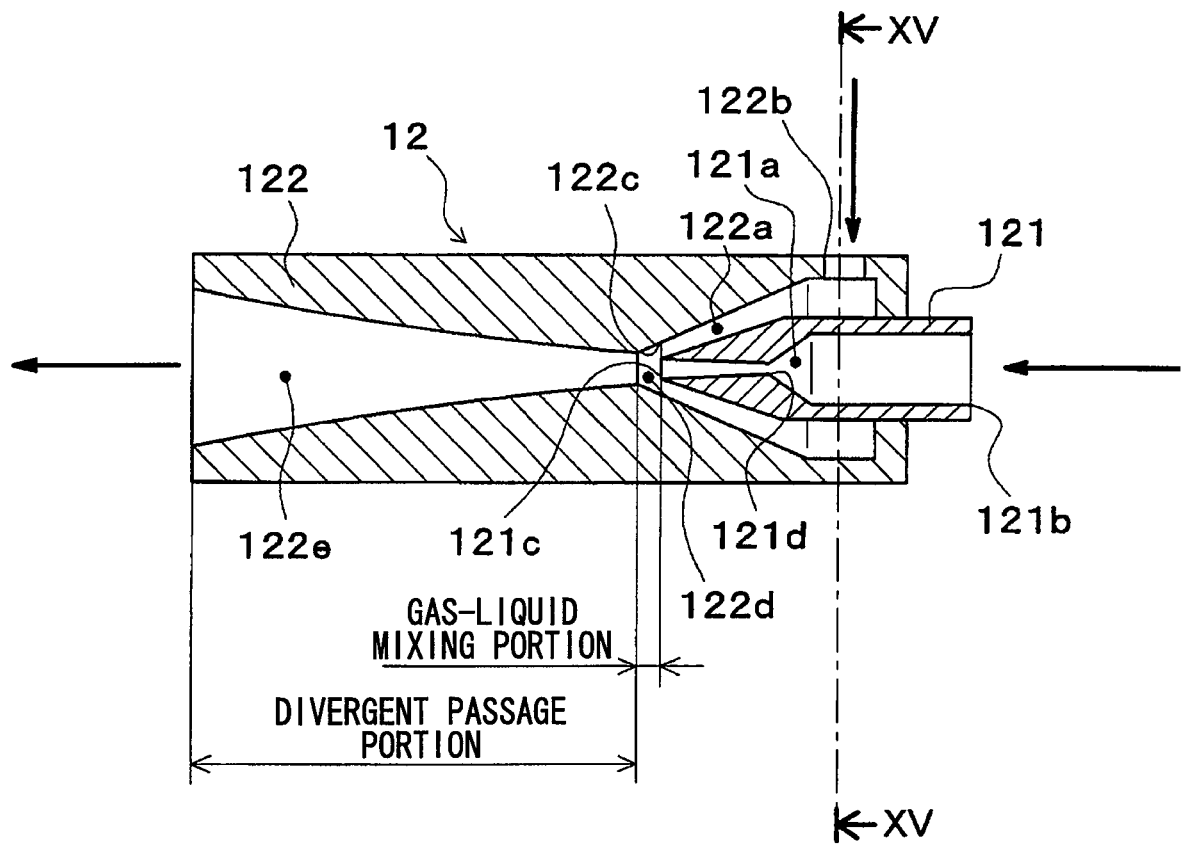
FIG. 14 is a cross-sectional view parallel to an axial direction of a liquid ejector according to a sixth embodiment of the present disclosure.

First, in a liquid ejector 12 of the sixth embodiment, as illustrated in FIG. 14, an inflow passage forming portion 121 having the same structure as a Laval nozzle is employed.

More specifically, in an inflow refrigerant passage 121a of an inflow passage forming portion 121 according to the sixth embodiment, a throat portion 121d having the smallest passage cross-sectional area is formed in the middle of the passage. Therefore, the passage cross-sectional area of the inflow refrigerant passage 121a gradually decreases from a refrigerant inflow port 121b side toward the throat portion 121d and gradually expands from the throat portion 121d toward a refrigerant outflow port 121c.

In this example, in the liquid ejector 12, when the discharged refrigerant from the compressor 11 is in a predetermined pressure condition or a predetermined enthalpy condition, the same configuration as that of the Laval nozzle is employed as the inflow passage forming portion 121, thereby making it possible to effectively increase the flow rate of the inflow refrigerant flowing into a gas-liquid mixing portion 122d from the refrigerant outflow port 121c.

Therefore, the liquid ejector 12 according to the sixth embodiment is applied to the ejector refrigeration cycles 10 to 10d in which the discharged refrigerant from the compressor 11 is under the predetermined pressure condition or the predetermined enthalpy condition, making it further easier to mix the ejection refrigerant and the inflow refrigerant together in the gas-liquid mixing portion 122d. As a result, the mixture refrigerant can be brought close to an ideal gas-liquid mixed state, and the ejector efficiency of the liquid ejector 12 can be further improved.

Next, a liquid ejector 12 according to the seventh embodiment is configured so that a refrigerant flowing through an ejection refrigerant passage 122a has a velocity component in a direction in which the refrigerant swirls around an axis of the inflow passage forming portion 121.

Figure 15:
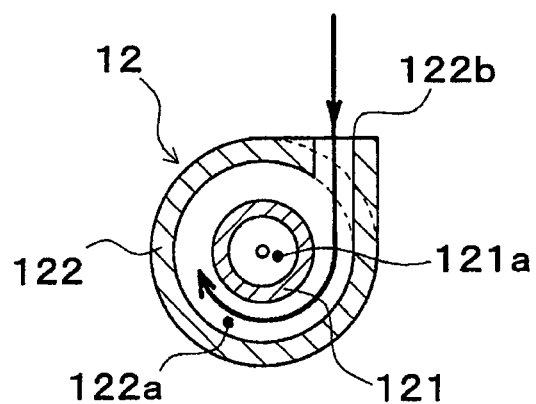
FIG. 15 is a cross-sectional view of a liquid ejector corresponding to a line XV-XV of FIG. 14 according to a seventh embodiment of the present disclosure.

More specifically, as illustrated in FIG. 15, in the liquid ejector 12 according to the seventh embodiment, when viewed from the axial direction of the inflow passage forming portion 121, a passage allowing the refrigerant to flow into the ejection refrigerant passage 122a through a driving refrigerant inflow port 122b is extended in a tangential direction of an outer circumferential side wall surface of the ejection refrigerant passage 122a.

Accordingly, the refrigerant that has flowed into the ejection refrigerant passage 122a flows along an outer circumferential side wall surface of the ejection refrigerant passage 122a as indicated by a thick solid arrow in FIG. 15 and swirls around the axis of the inflow passage forming portion 121. Furthermore, the ejection refrigerant ejected from the refrigerant ejection port 122c to the gas-liquid mixing portion 122d also has a velocity component in the direction of swirling around the axis of the inflow passage forming portion 121.

This makes it easier to mix the ejection refrigerant and the inflow refrigerant in the gas-liquid mixing portion 122d and makes it possible to bring the mixture refrigerant closer to an ideal gas-liquid mixed state.

Next, a liquid ejector 12 according to the eighth embodiment is configured so that a refrigerant flowing through an inflow refrigerant passage 121a has a velocity component in a direction in which the refrigerant swirls around an axis of an inflow passage forming portion 121.

Figure 16:
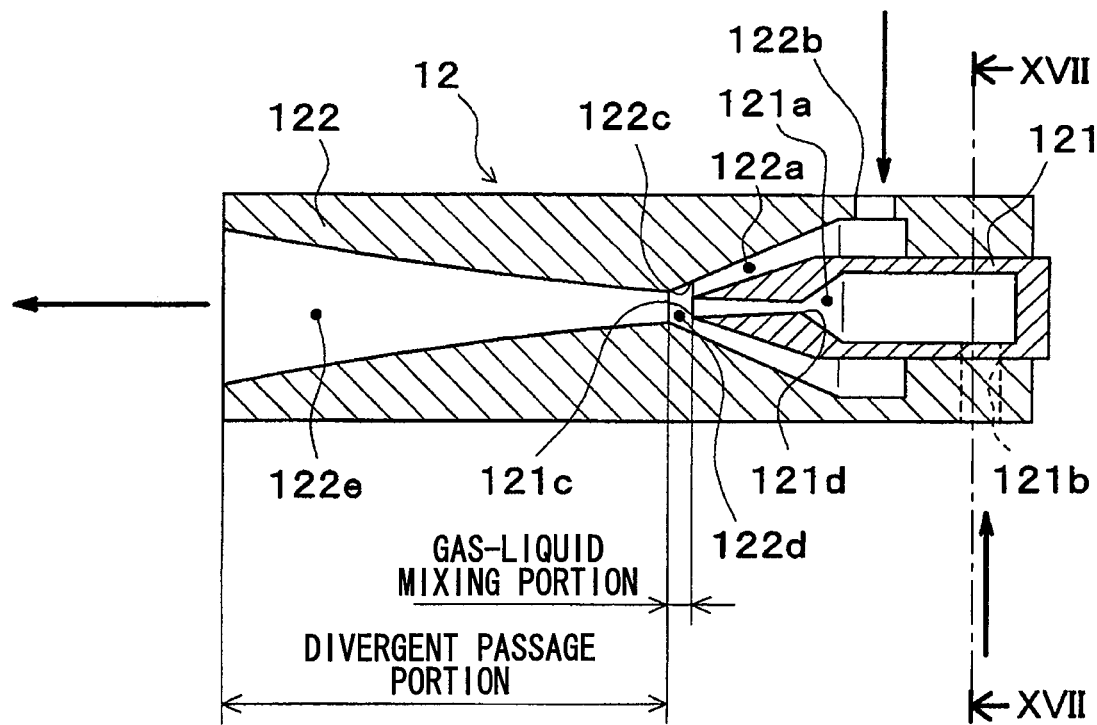
FIG. 16 is a cross-sectional view parallel to an axial direction of a liquid ejector according to an eighth embodiment of the present disclosure.
Figure 17:
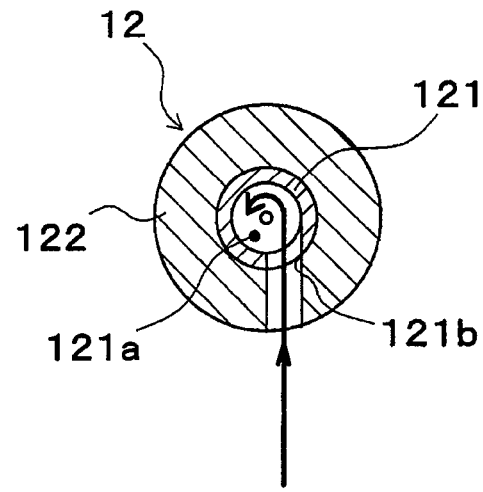
FIG. 17 is a cross-sectional view taken along a line XVII-XVII in FIG. 16.

More specifically, in the liquid ejector 12 according to the eighth embodiment, as illustrated in FIG. 16, a refrigerant inflow port 121b is provided in a cylindrical side surface of an inflow passage forming portion 121. As illustrated in FIG. 17, when viewed from the axial direction of the inflow passage forming portion 121, a passage for allowing the refrigerant to flow into the inflow refrigerant passage 121a through the refrigerant inflow port 121b extends in a tangential direction of an outer circumferential side wall surface of the inflow refrigerant passage 121a.

Accordingly, the refrigerant that has flowed into the inflow refrigerant passage 121a flows along the outer circumferential side wall surface of the inflow refrigerant passage 121a as indicated by a thick solid arrow in FIG. 17 and swirls around an axis of the inflow refrigerant passage 121a. Further, the inflow refrigerant flowing into a gas-liquid mixing portion 122d from the refrigerant outflow port 121c also has a velocity component in the direction of swirling around the axis of the inflow passage forming portion 121.

This makes it easier to mix the ejection refrigerant and the inflow refrigerant in the gas-liquid mixing portion 122d and makes it possible to bring the mixture refrigerant closer to an ideal gas-liquid mixed state. In the case where the refrigerant flowing through the ejection refrigerant passage 122a is swirled around the axis of the inflow passage forming portion 121 as in the seventh embodiment, it is desirable that the swirling direction of the refrigerant flowing in the inflow refrigerant passage 121a and the swirling direction of the refrigerant flowing in the ejection refrigerant passage 122a are swirled in mutually opposite directions.

Figure 18:
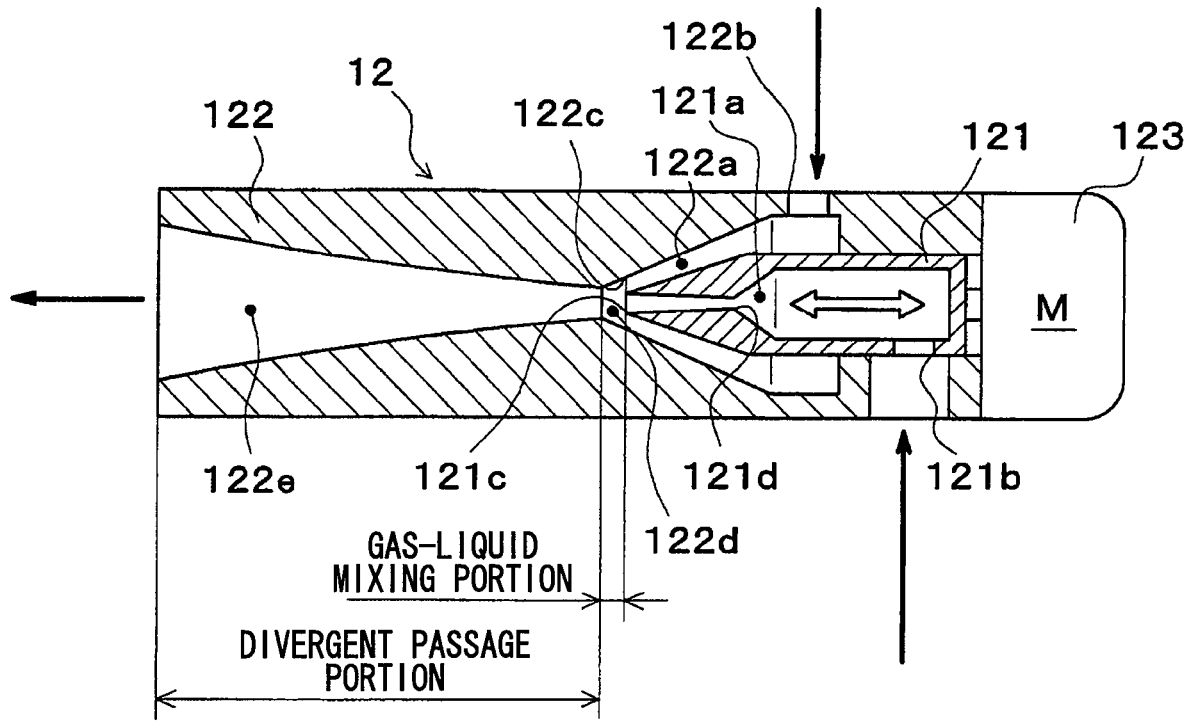
FIG. 18 is a cross-sectional view parallel to an axial direction of a liquid ejector according to a ninth embodiment of the present disclosure.

Next, in a liquid ejector 12 according to the ninth embodiment, as illustrated in FIG. 18, an electric actuator 123 formed of a stepping motor is provided. The electric actuator 123 is a drive device that changes a passage cross-sectional area of the ejection refrigerant passage 122a while displacing the inflow passage forming portion 121 in an axial direction. Further, the operation of the electric actuator 123 is controlled by a control pulse output from the control device.

Since the liquid ejector 12 according to the ninth embodiment includes the electric actuator 123, the passage cross-sectional area of the ejection refrigerant passage 122a can be adjusted according to a load variation of the applied ejector refrigeration cycles 10 to 10d. Therefore, the liquid ejector 12 can be appropriately operated according to the load variation of the ejector refrigeration cycles 10 to 10d.

Figure 19:
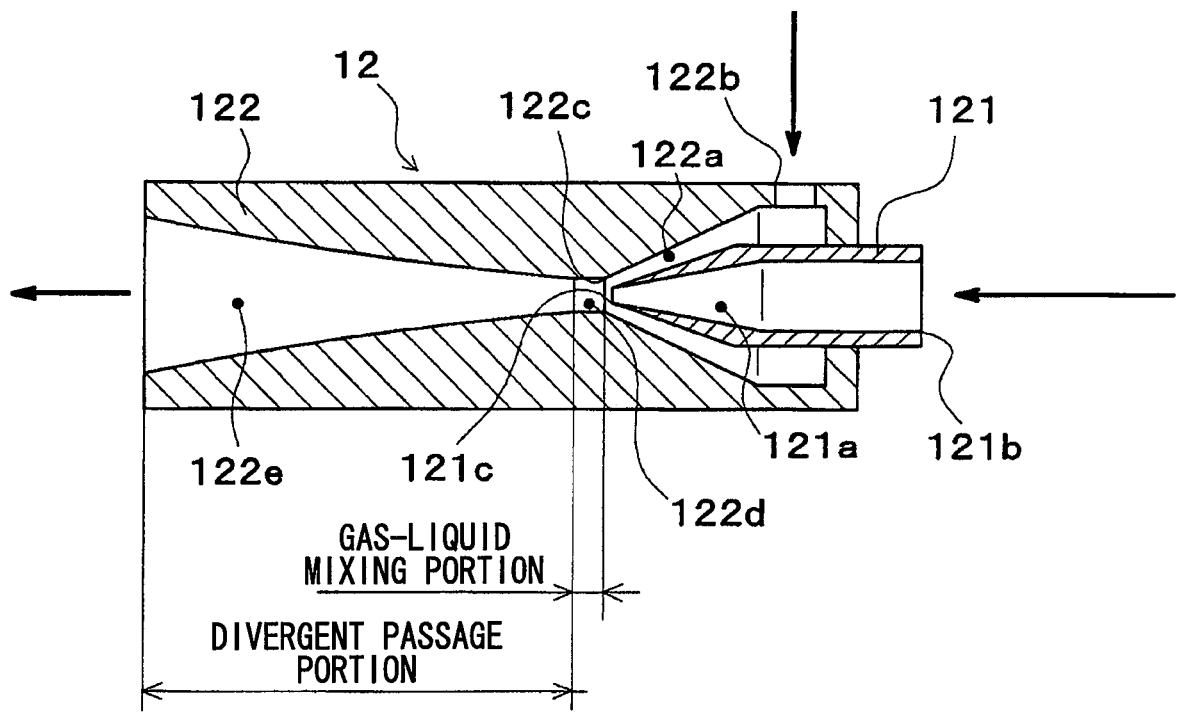
FIG. 19 is a cross-sectional view parallel to an axial direction of a liquid ejector according to a tenth embodiment of the present disclosure.

Next, in a liquid ejector 12 according to the tenth embodiment, as illustrated in FIG. 19, a gas-liquid mixing portion 122d is formed by a circular column space, an axial direction of which extends in a refrigerant flow direction. According to the above configuration, a flow rate of the mixture refrigerant can be easily lowered as compared with the case where the gas-liquid mixing portion 122d is formed in a truncated cone-shaped space in which the passage cross-sectional area gradually decreases in the refrigerant flow direction. Therefore, the mixture refrigerant can be reliably shifted from the supersonic speed state to the subsonic speed state.

In other words, the liquid ejector 12 according to the tenth embodiment makes it possible to reliably generate condensed shock waves in the mixture refrigerant and to cause the liquid ejector 12 to exhibit stable pressure increasing performance.

Figure 20:
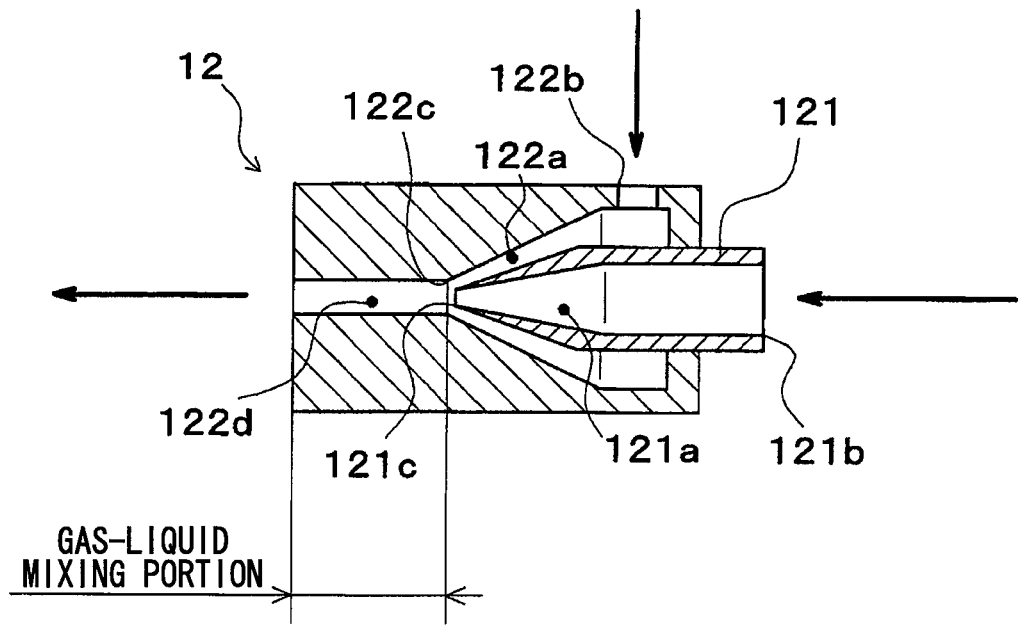
FIG. 20 is a cross-sectional view parallel to an axial direction of a liquid ejector in a modification according to the tenth embodiment.

Further, as a modification of the liquid ejector 12 according to the tenth embodiment, the divergent passage portion 122e may be eliminated as illustrated in FIG. 20. In that case, it is desirable to secure a sufficient axial length of the circular column space forming the gas-liquid mixing portion 122d to such an extent that the condensed shock waves can be generated in the gas-liquid mixing portion 122d.

Eleventh Embodiment

As described in the above embodiments, the liquid ejector 12 exhibits the pressure increasing action by leveraging the shock wave generated when the flow rate of the mixture refrigerant shifts from the supersonic speed state to the subsonic speed state. In other words, with the propagation of the shock wave to the refrigerant on a downstream side of the liquid ejector 12 as for water hammering, a pressure of the refrigerant on the downstream side of the liquid ejector 12 (refrigerant on the inlet side of the radiator 13) is raised higher than the pressure of the inflow refrigerant (discharged refrigerant from the compressor 11).

Therefore, in order to further improve the pressure increasing capacity of the liquid ejector 12, the present inventors have studied effective propagation of the energy of the shock wave to the refrigerant.

The present inventors have obtained the following knowledge through the above study. First, when the shock wave propagates to the refrigerant on the downstream side of the liquid ejector 12, the shock wave is reflected to a liquid surface of the condensed liquid-phase refrigerant or a liquid droplet in a gas-liquid two-phase refrigerant with high dryness to generate a reflected wave traveling from the droplet side to the gas-liquid mixing portion 122d side. The reflected wave has a speed and a phase difference depending on the sound speed, and has a component from a low frequency to a high frequency.

In this example, in a water hammer phenomenon occurring in ordinary pipe, the reflected wave propagating at the sound speed goes back to the upstream side, and is further reflected at the upstream end, causing sound, flow rate variations and the like. On the other hand, in the liquid ejector 12, since the mixture refrigerant immediately after having flowed into the gas-liquid mixing portion 122d puts into a supersonic speed state, the reflected wave stands from the inlet side of the gas-liquid mixing portion 122d to the liquid surface (or droplets). In other words, the reflected wave reciprocates between the liquid surface and the inlet side of the gas-liquid mixing portion 122d.

With the standing of the reflected wave, in the liquid ejector 12, the pressure of the downstream side refrigerant (the inlet side refrigerant of the radiator 13) of the liquid ejector 12 is raised higher than the pressure of the inflow refrigerant (the discharged refrigerant from the compressor 11).

Figure 21:
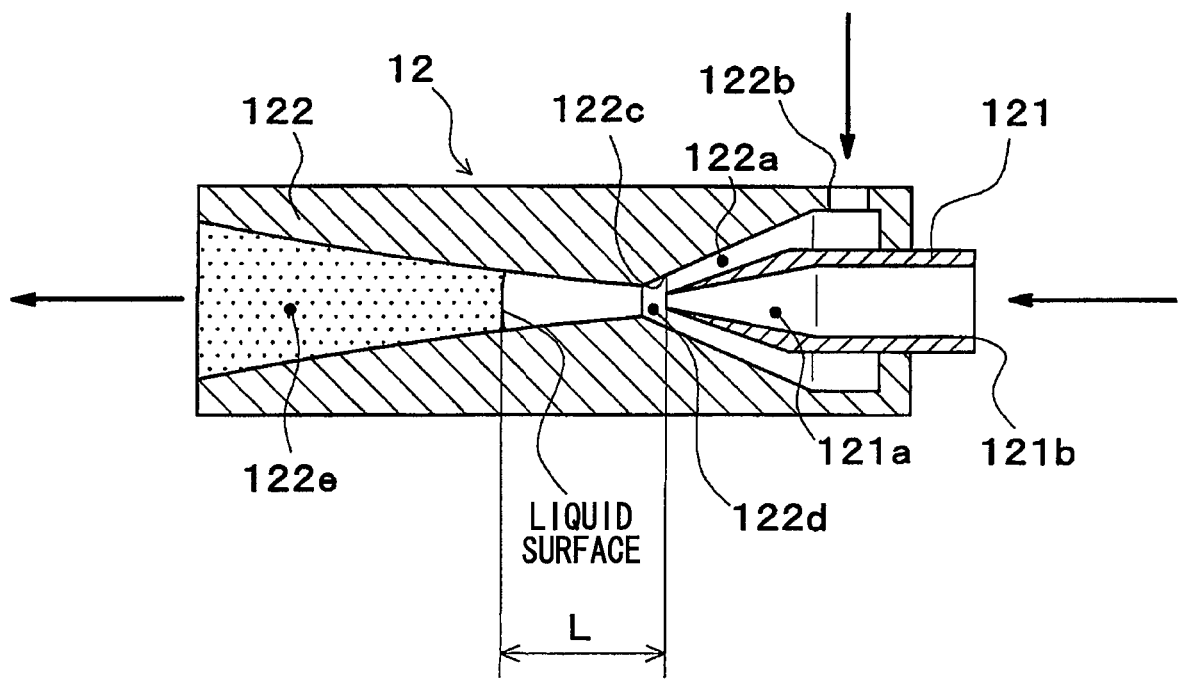
FIG. 21 is a cross-sectional view parallel to an axial direction of a liquid ejector illustrating a distance L, according to an eleventh embodiment of the present disclosure.

Therefore, as illustrated in a cross-sectional view of FIG. 21, if a distance L from an inlet side of the gas-liquid mixing portion 122d to a liquid surface can be made to coincide with an integral multiple of the half wavelength of the sound speed, the reflected wave standing between the inlet side of the gas-liquid mixing portion 122d and the liquid surface can be resonated (resonated). It is found that with the resonance, the energy of the shock wave can be effectively propagated to the refrigerant, resulting in an improvement in the pressure increasing capacity of the liquid ejector 12.

Further, according to the study of the prevent inventors, it is found that the position of the liquid surface (that is, the distance L in FIG. 21) can be changed by adjusting the pressure of the refrigerant on the outlet side of the divergent passage portion 122e of the liquid ejector 12.

Figure 22:
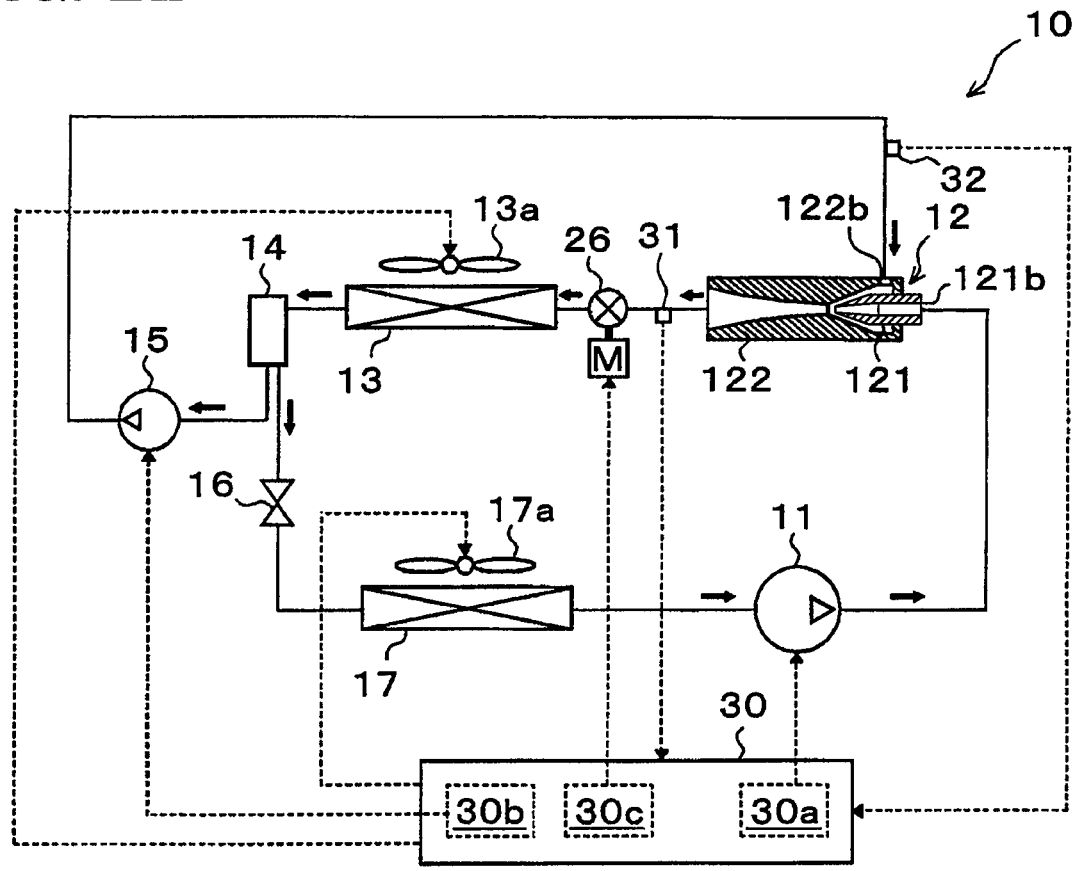
FIG. 22 is a schematic diagram illustrating an ejector refrigeration cycle according to the eleventh embodiment of the present disclosure.

Therefore, in the present embodiment, as illustrated in FIG. 22, a description will be given of an example in which an area adjustment valve 26 is added to a refrigerant passage extending from an outlet side of a divergent passage portion 122e of a liquid ejector 12 to a refrigerant inlet side of a radiator 13 in the ejector refrigeration cycle 10 described in the first embodiment. The area adjustment valve 26 is added to the refrigerant passage leading to the refrigerant passage. The area adjustment valve 26 is an area changing device that changes the passage cross-sectional area of the refrigerant passage extending from the outlet side of the liquid ejector 12 to the refrigerant inlet side of the radiator 13.

More specifically, the area adjustment valve 26 includes a valve body configured to be capable of changing the refrigerant passage area, and an electric actuator that displaces the valve body. Furthermore, the operation of the area adjustment valve 26 is controlled according to a control signal output from the control device 30. Therefore, a basic configuration of the area adjustment valve 26 is equivalent to that of a general electric flow rate adjustment valve.

However, in the present embodiment, as the area adjustment valve 26, a flow rate adjustment valve small in the change amount in the passage cross-sectional area is employed. Therefore, even when the area adjustment valve 26 changes the passage cross-sectional area, the pressure of the refrigerant on the outlet side of the liquid ejector 12 can be reduced without substantially changing the flow rate of the refrigerant flowing out of the liquid ejector 12 and flowing into the radiator 13.

Furthermore, in addition to the above-described sensor group, the control device 30 according to the present embodiment is connected with an outlet side pressure sensor 31 that detects the pressure (liquid ejector outlet refrigerant pressure) of the refrigerant on the outlet side of the divergent passage portion 122e of the liquid ejector 12, a drive side pressure sensor 32 that detects the pressure (liquid ejector drive refrigerant pressure) of the liquid-phase refrigerant pumped from the liquid pump 15, and the like.

Meanwhile, FIG. 22 also illustrates the control device 30, which is not shown in FIG. 1 of the first embodiment, and connection modes of the control device 30 and the various control target devices 11, 13 a, 15, 17 a, 26, and so on.

In addition, in the control device 30 according to the present embodiment, the configuration (hardware and software) for controlling the operation of the compressor 11 configures the discharge capacity control device 30a, and the configuration for controlling the operation of the liquid pump 15 configures a pumping capacity control device 30b, and the configuration for controlling the operation of the area adjustment valve 26 configures an area control device 30c. The other configurations of the ejector refrigeration cycle 10 are identical with those in the first embodiment.

Subsequently, the operation of the present embodiment having the above configuration will be described. As described above, the resonance of the reflected wave occurs when the distance L described with reference to FIG. 21 is made to coincide with an integer multiple of the half wavelength of the sound speed. Accordingly, a pressure difference obtained by subtracting the pressure of the inflow refrigerant from the pressure of the inlet side refrigerant of the radiator 13 changes so as to have a local maximum value with respect to the change in the distance L. Therefore, the area control device 30 c of the present embodiment controls the operation of the area adjustment valve 26 so that the pressure difference approaches the local maximum value.

More specifically, the area control device 30c determines a target outlet side pressure of the refrigerant on the outlet side of the liquid ejector 12 on the basis of the refrigerant discharge capacity of the compressor 11 and the pumping capacity of the liquid pump 15, and so on, with reference to the control map stored in the storage circuit of the control device 30 in advance. The area control device 30c controls the operation of the area adjustment valve 26 through a feedback control technique so that the detection value of the outlet side pressure sensor 31 comes closer to the target outlet side pressure.

As such a control map, one obtained by storing an actually measured value as a target outlet side pressure when the distance L becomes approximately the half wavelength of the sound speed can be employed. The other operation is the same as that in the first embodiment.

Figure 23:
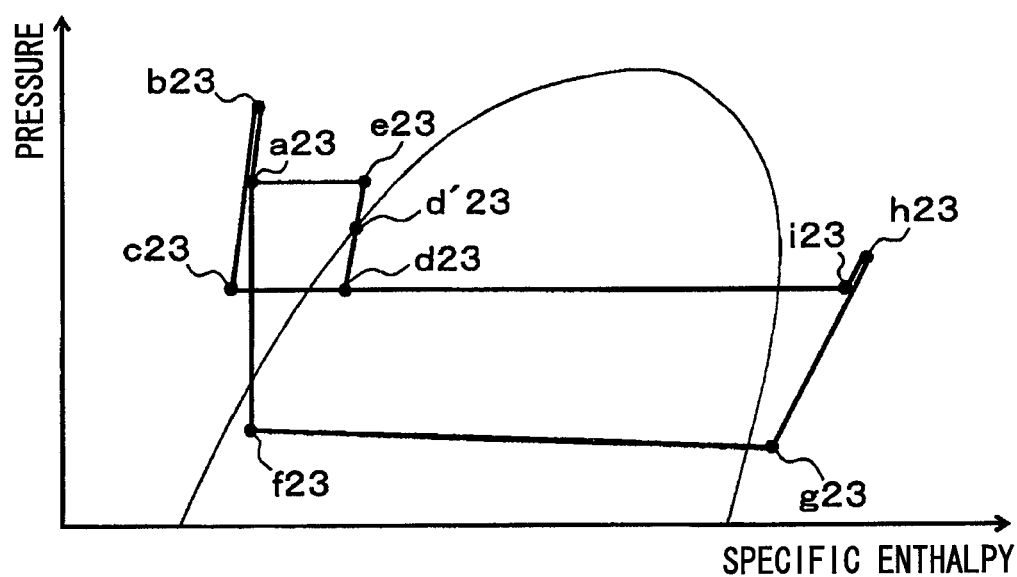
FIG. 23 is a Mollier diagram illustrating a change in a state of a refrigerant in the ejector refrigeration cycle according to the eleventh embodiment.

Therefore, when the ejector refrigeration cycle 10 according to the present embodiment is operated, as shown in the Mollier diagram of FIG. 23, the ejection refrigerant in the liquid-phase state which has been ejected from the refrigerant ejection port 122c and the inflow refrigerant in the gas-phase state which has flowed in through the refrigerant inflow port 121b are mixed together in the gas-liquid mixing portion 122d (from a point c23 to a point d23; from a point i23 to a point d23 in FIG. 23 in the stated order) as in the first embodiment.

The shock wave is generated when the flow rate of the mixture refrigerant of the ejection refrigerant and the inflow refrigerant shifts from a supersonic speed state to a subsonic speed state. The pressure of the mixture refrigerant is increased due to the action of the shock wave and gas-phase refrigerant in the mixture refrigerant is condensed (from a point d23 to a point d'23 in FIG. 23).

At this time, in the present embodiment, the area control device 30c of the control device 30 controls the operation of the area adjustment valve 26 so that a pressure difference obtained by subtracting the pressure of the inflow refrigerant from the pressure of the inlet side refrigerant of the radiator 13 (a pressure difference obtained by subtracting a pressure at the point i23 from a pressure at the point e23 in FIG. 23) comes closer to the local maximum value. The liquid surface of the refrigerant condensed by the shock wave is formed in the divergent passage portion 122e.

Further, a kinetic energy of the refrigerant condensed in the divergent passage portion 122e is converted into a pressure energy by enlarging the passage cross-sectional area of the divergent passage portion 122e. As a result, the pressure of the refrigerant flowing out of the divergent passage portion 122e further increases (from a point d '23 to a point e23 in FIG. 23). The refrigerant that has flowed out of the divergent passage portion 122e flows into the radiator 13 through the area adjustment valve 26. The other operation is the same as that in the first embodiment.

According to the ejector refrigeration cycle 10 of the present embodiment, as in the first embodiment, the blown air to be blown into the vehicle compartment can be cooled by the low-pressure evaporator 17. Further, the discharged refrigerant pressure (refrigerant discharge capacity) of the compressor 11 can be lowered due to the pressure increasing action of the liquid ejector 12 to improve the COP of the cycle.

Further, in the ejector refrigeration cycle 10 according to the present embodiment, since the area adjustment valve 26 is provided, the position (that is, the distance L in FIG. 21) of the liquid surface condensed in the divergent passage portion 122e can be changed. Further, the operation of the area adjustment valve 26 is controlled so that the pressure difference obtained by subtracting the pressure of the inflow refrigerant from the pressure of the inlet side refrigerant of the radiator 13 comes closer to the local maximum value.

Therefore, according to the ejector refrigeration cycle 10 of the present embodiment, the pressure difference obtained by subtracting the pressure of the inflow refrigerant from the pressure of the inlet side refrigerant of the radiator 13 can be effectively increased, and the COP of the cycle can be further improved.

Twelfth Embodiment

In the eleventh embodiment, an example in which the liquid surface is generated in the divergent passage portion 122e of the liquid ejector 12 has been described. However, in the liquid ejector 12, even if the liquid surface does not exist in the divergent passage portion 122e, the boosting action can be exerted. This is because in the liquid ejector 12, the pressure increasing action is exerted by leveraging the shock waves generated when the flow rate of the mixture refrigerant shifts from the supersonic speed state to the subsonic speed state.

Figure 24:
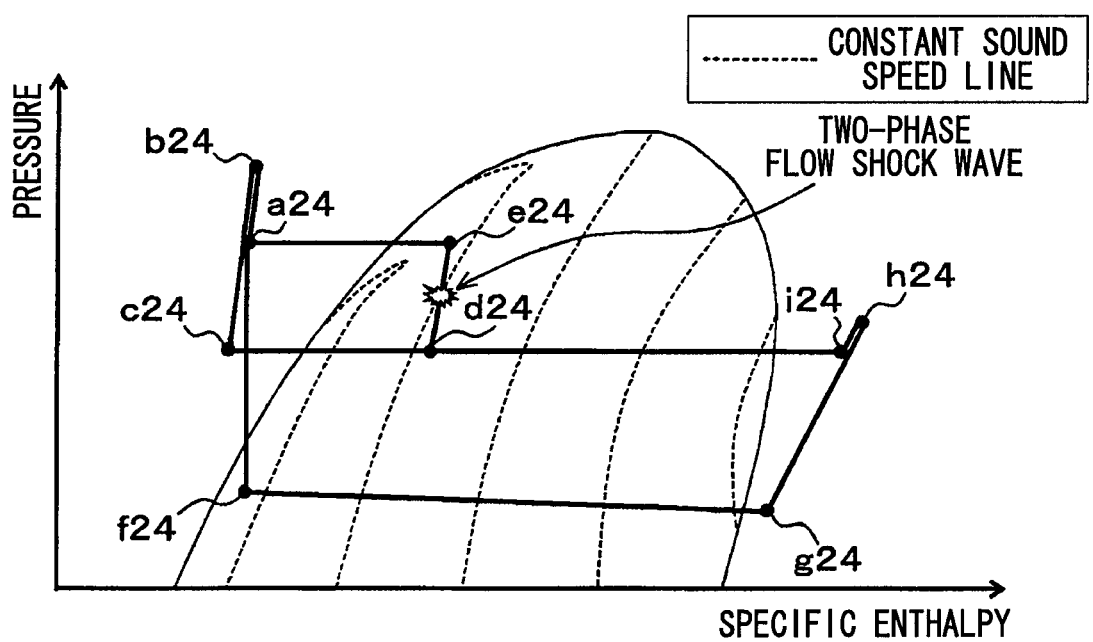
FIG. 24 is a Mollier diagram illustrating a change in a state of a refrigerant in the ejector refrigeration cycle according to a twelfth embodiment.

For example, as shown in the Mollier diagram of FIG. 24, in a process (from a point d24 to a point e24 in FIG. 24) in which the pressure of the refrigerant increases in the divergent passage portion 122e, when the dryness of the refrigerant is lowered so as to cross a constant sound speed line indicated by thin broken lines, a shock wave can be generated without generating the liquid surface in the diverging passage portion 122e of the liquid ejector 12. Hereinafter, for the sake of clarity of description, the shock wave is referred to as two-phase flow shock waves.

Figure 25:
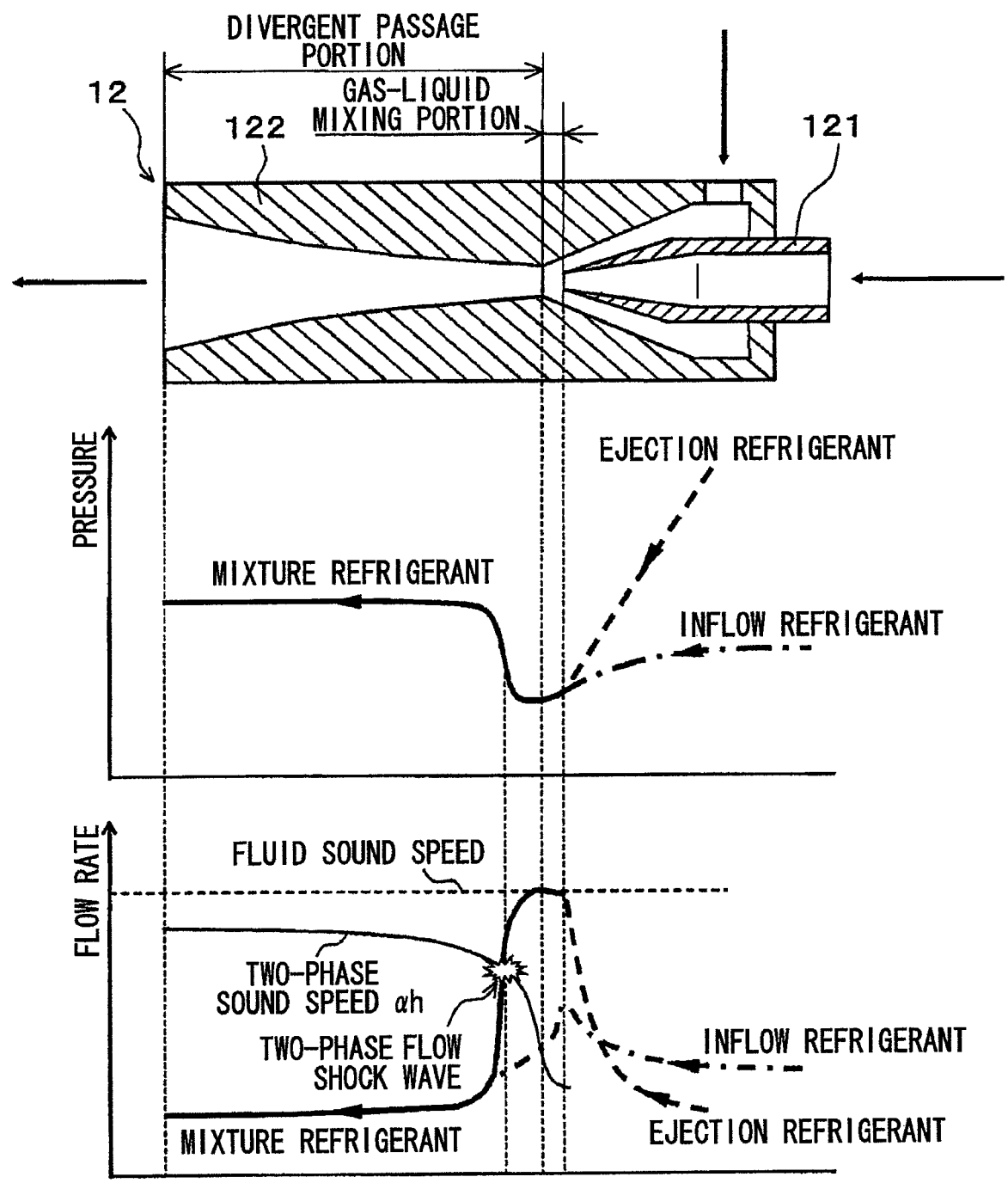
FIG. 25 is a diagram illustrating a pressure change and a flow rate change of a refrigerant in the liquid ejector according to a twelfth embodiment.

Since there is no liquid surface in the vicinity of the two-phase flow shock wave, as illustrated in FIG. 25, a velocity difference between the liquid-phase refrigerant and the gas-phase refrigerant is difficult to reduce. Therefore, the flow rate of the mixture refrigerant immediately after the two-phase flow shock wave has been generated changes more gradually than that when the refrigerant starts condensing immediately after the shock wave has been generated. Therefore, the two-phase flow shock wave puts into a weak shock wave with less energy loss than that of the condensed shock wave that causes the liquid surface to be generated inside of the divergent passage portion 122e of the liquid ejector 12.

According to the study of the present inventors, as described in the eleventh embodiment, similarly, the two-phase flow shock wave is also reflected on the liquid droplet in the gas-liquid two-phase refrigerant with high dryness to generate a reflected wave. It has been found that the pressure difference obtained by subtracting the pressure of the inflow refrigerant from the pressure of the inlet side refrigerant of the radiator 13 can be increased with the resonance of the reflected wave standing in the liquid ejector 12.

Furthermore, according to the study of the present inventors, it is found that when the two-phase flow shock wave, which is a weak shock wave, is leveraged to cause the liquid ejector 12 to exhibit the pressure increasing action, the pressure of the liquid-phase refrigerant that is discharged from the liquid pump 15 and flows into the driving refrigerant inflow port 122b is changed, to thereby change the pressure increasing capacity of the liquid ejector 12.

Therefore, in the present embodiment, in the ejector refrigeration cycle 10 which is exactly the same as that in the eleventh embodiment shown in FIG. 22, the area control device 30c controls the operation of the area adjustment valve 26 and the pumping capacity control device 30b controls the operation of the liquid pump 15 so that the pressure difference obtained by subtracting the pressure of the inflow refrigerant from the pressure of the inlet side refrigerant of the radiator 13 approaches the local maximum value.

More specifically, the pumping capacity control device 30b determines a target drive side pressure on the basis of the refrigerant discharge capacity of the compressor 11 and the like with reference to the control map stored in advance in the storage circuit of the control device 30. The pumping capacity control device 30b controls the operation of the liquid pump 15 through the feedback control technique so that the detection value of the drive side pressure sensor 32 comes closer to a target drive side pressure.

As such a control map, a map in which the liquid ejector drive refrigerant pressure that can obtain the local maximum value when the area adjustment valve 26 actually changes the passage cross-sectional area is stored as the target drive side pressure can be employed.

Further, the area control device 30c determines a target outlet side pressure of the refrigerant on the outlet side of the liquid ejector 12 on the basis of the refrigerant discharge capacity of the compressor 11 and the pumping capacity of the liquid pump 15, with reference to the control map stored in the storage circuit of the control device 30 in advance. The area control device 30c controls the operation of the area adjustment valve 26 through a feedback control technique so that the detection value of the outlet side pressure sensor 31 comes closer to the target outlet side pressure. The other operation is the same as that in the first embodiment.

Therefore, when the ejector refrigeration cycle 10 according to the present embodiment is operated, as shown in the Mollier diagram of FIG. 24, the ejection refrigerant in the liquid-phase state which has been ejected from the refrigerant ejection port 122c and the inflow refrigerant in the gas-phase state which has flowed in through the refrigerant inflow port 121b are mixed together in the gas-liquid mixing portion 122d (from a point c24 to a point d24; from a point i24 to a point d24 in FIG. 24 in the stated order) as in the first embodiment.

The mixture refrigerant mixed in the gas-liquid mixing portion 122d flows into the divergent passage portion 122e. In the divergent passage portion 122e, a kinetic energy of the mixture refrigerant is converted into a pressure energy with an increase in the passage cross-sectional area. With the above configuration, the mixture refrigerant increases the pressure while decreasing the dryness. The two-phase flow shock wave is generated when the flow rate of the mixture refrigerant shifts from the supersonic speed state to the subsonic speed state. The pressure of the mixture refrigerant is further increased due to the action of the two-phase flow shock wave (from a point d24 to a point e24 in FIG. 24).

At this time, in the present embodiment, the area control device 30c of the control device 30 controls the operation of the area adjustment valve 26 so that a pressure difference obtained by subtracting the pressure of the inflow refrigerant from the pressure of the inlet side refrigerant of the radiator 13 (a pressure difference obtained by subtracting a pressure at the point i24 from a pressure at the point e24 in FIG. 24) comes closer to the local maximum value.

The mixture refrigerant in the gas-liquid two-phase state which has flowed out of the divergent passage portion 122e flows into the radiator 13 through the area adjustment valve 26. The liquid-phase refrigerant that has flowed into the radiator 13 exchanges and condenses the heat with the outside air blown by the cooling fan 13a to further lower the enthalpy (from a point e24 to a point a24 in FIG. 24). The subcooled liquid-phase refrigerant that has flowed out of the radiator 13 is stored in the liquid receiver 14. The other operation is the same as that in the first embodiment.

Therefore, according to the ejector refrigeration cycle 10 of the present embodiment, as in the eleventh embodiment, the pressure difference obtained by subtracting the pressure of the inflow refrigerant from the pressure of the inlet side refrigerant of the radiator 13 can be effectively increased, and the COP of the ejector refrigeration cycle 10 can be further improved.

In this example, in the eleventh and twelfth embodiments, an example in which the area changing device (area adjustment valve 26) is added to the ejector refrigeration cycle 10 described in the first embodiment, and the operation of the area adjustment valve 26 is controlled so that the pressure difference approaches the local maximum value in the ejector refrigeration cycle 10 described in the first embodiment has been described. However, the ejector refrigeration cycle that can add the area changing device is not limited to the above configuration. It is needless to say that the area changing device may be applied to the ejector refrigeration cycles 10a to 10d described in the second to fifth embodiments.

Figure 26:
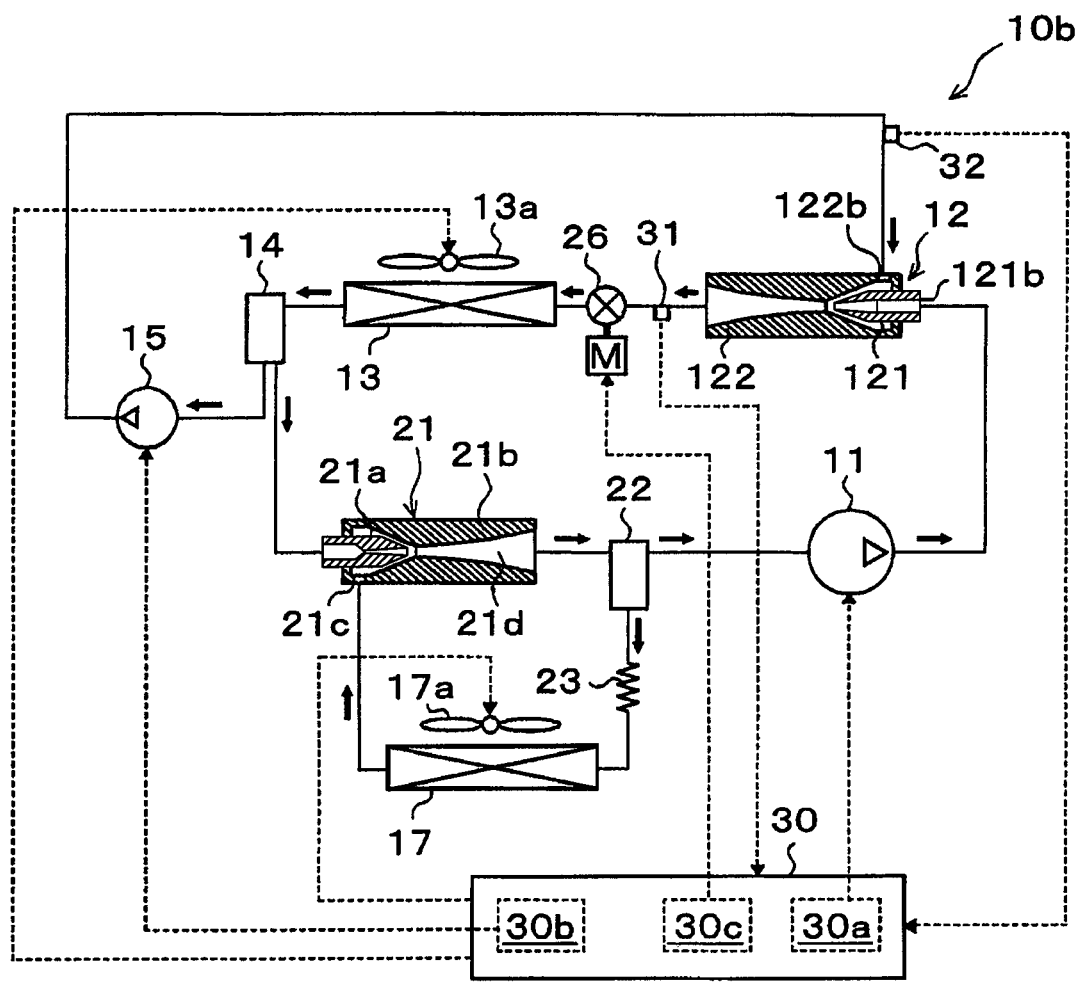
FIG. 26 is a schematic diagram illustrating an ejector refrigeration cycle in a modification according to the twelfth embodiment of the present disclosure.

For example, FIG. 26 shows an example in which the area changing device is added to the ejector refrigeration cycle 10b described in the third embodiment. According to the configuration, the pressure increasing action of the liquid ejector 12 can be increased, and the pressure of the intake refrigerant into the compressor 11 can be increased by the pressure increasing action of the low-pressure ejector 21. Therefore, the COP of the ejector refrigeration cycle 10c can be improved extremely effectively.

Thirteenth and Fourteenth Embodiments

The effects of improving the COP by the area changing device (the area adjustment valve 26) described in the eleventh and twelfth embodiments can be obtained even if the mixture refrigerant in the gas-liquid mixing portion 122d is not necessarily put into an ideal gas-liquid mixed state. Therefore, as the liquid ejector 12, a configuration in which the ejection refrigerant passage for ejecting the pumping refrigerant from the liquid pump 15 to the gas-liquid mixing portion 122d is installed on the inner circumferential side of the inflow refrigerant passage through which the discharged refrigerant from the compressor 11 flows into the gas-liquid mixing portion 122d may be employed.

Figure 27:
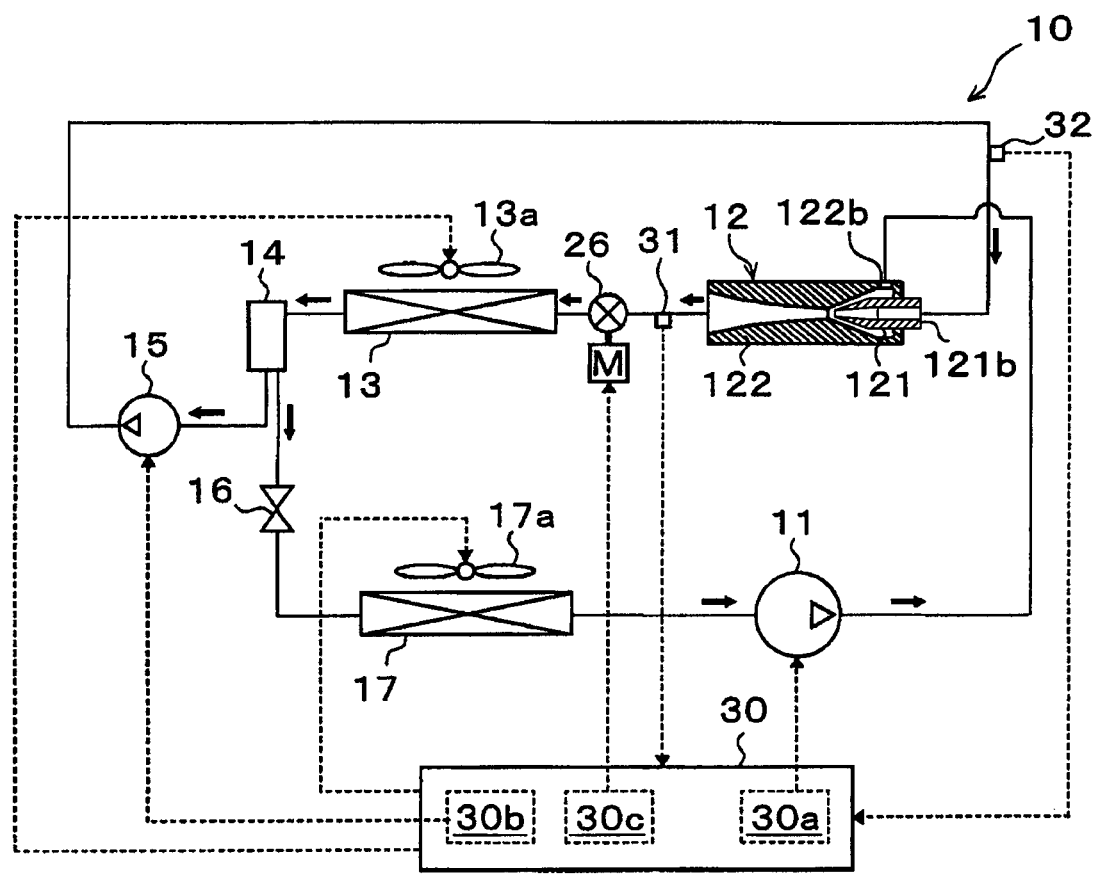
FIG. 27 is a schematic diagram illustrating an ejector refrigeration cycle according to a thirteenth embodiment of the present disclosure.

Therefore, in the thirteenth embodiment, as illustrated in FIG. 27, the cycle configuration of the ejector refrigeration cycle 10 described in the eleventh embodiment is changed. More specifically, in the ejector refrigeration cycle 10 according to the thirteenth embodiment, the discharge port of the compressor 11 is connected to the refrigerant inflow port 122b side of the liquid ejector 12, and the discharge port of the liquid pump 15 is connected to the inflow port 121b side of the ejection refrigerant passage of the liquid ejector 12.

The other configurations and operations are the same as those of the eleventh embodiment. Therefore, also in the ejector refrigeration cycle 10 of the present embodiment, the operation of the area adjustment valve 26 is controlled so that the pressure difference obtained by subtracting the pressure of the inflow refrigerant from the pressure of the inlet side refrigerant of the radiator 13 comes closer to the local maximum value. As a result, the COP of the cycle can be effectively improved.

Figure 28:
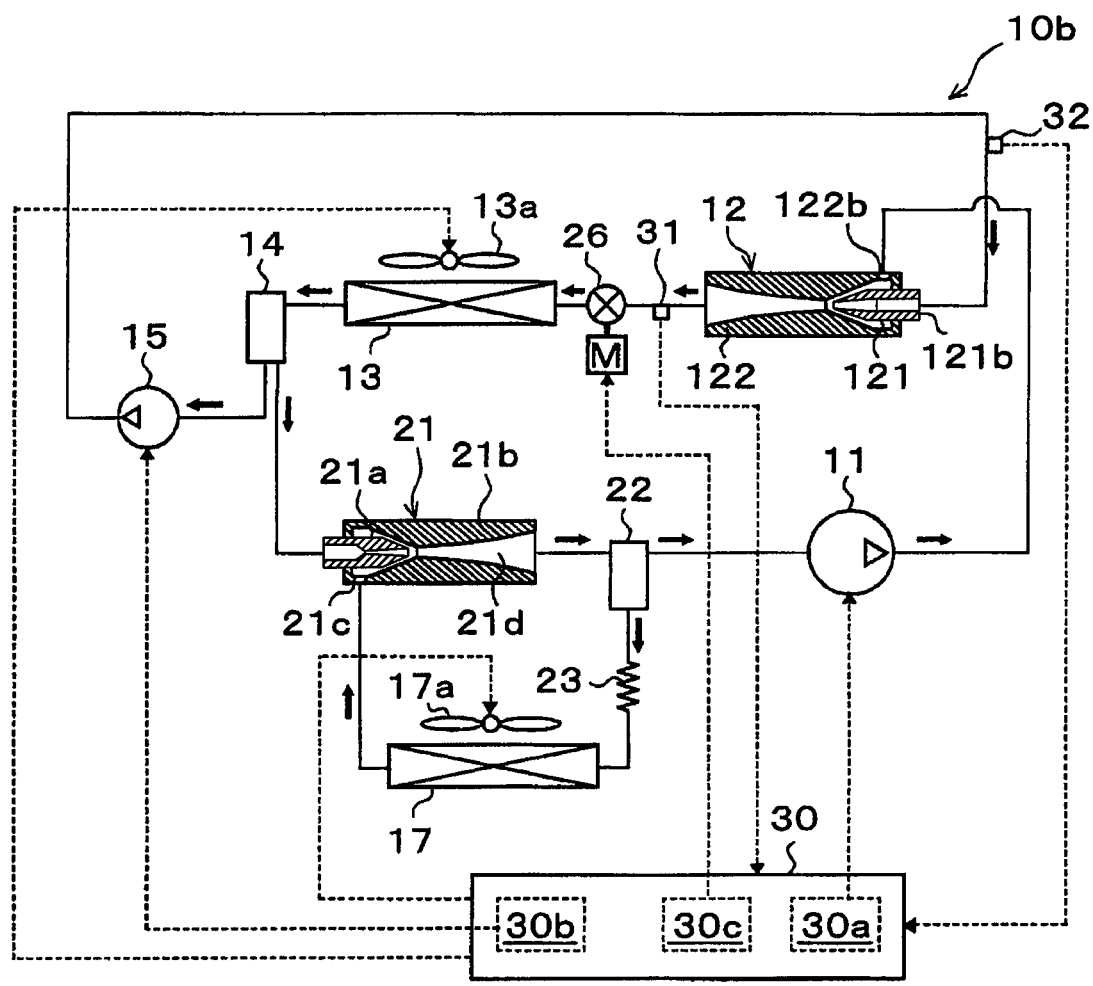
FIG. 28 is a schematic diagram illustrating an ejector refrigeration cycle according to a fourteenth embodiment of the present disclosure.

In addition, in the fourteenth embodiment, as illustrated in FIG. 28, the cycle configuration of the ejector refrigeration cycle 10b described as the modification in the twelfth embodiment is changed. More specifically, in the ejector refrigeration cycle 10b of the fourteenth embodiment, the discharge port of the compressor 11 is connected to the refrigerant inflow port 122b side of the liquid ejector 12, and the discharge port of the liquid pump 15 is connected to the inflow port 121b side of the ejection refrigerant passage of the liquid ejector 12.

The other configurations and operations are the same as those of the eleventh embodiment. Therefore, also in the ejector refrigeration cycle 10 of the present embodiment, the operation of the area adjustment valve 26 is controlled so that the pressure difference obtained by subtracting the pressure of the inflow refrigerant from the pressure of the inlet side refrigerant of the radiator 13 comes closer to the local maximum value. As a result, the COP of the cycle can be effectively improved.

As is apparent from the above description, in the thirteenth and fourteenth embodiments, the inflow refrigerant passage, the inflow passage forming portion, the refrigerant inflow port, and the driving refrigerant inflow port described in the first and third embodiments correspond to the ejection refrigerant passage, the ejection refrigerant passage forming portion 121, the inflow port 121b of the ejection refrigerant passage, and the refrigerant inflow port 122b, respectively.

The present disclosure is not limited to the above-described embodiments, but various modifications can be made thereto as follows without departing from the spirit of the present disclosure. The device disclosed in the respective embodiments may be appropriately combined together in an implementable range.

In the above respective embodiments, the example in which the ejector refrigeration cycles 10 to 10d of the present disclosure are applied to the vehicle air conditioning apparatus has been described, but the application of the ejector refrigeration cycles 10 to 10d is not limited to the above configuration. For example, the ejector refrigeration cycle may be applied to a vehicle refrigeration apparatus, a stationary air conditioning apparatus, a cold storage warehouse or the like.

The respective configuration equipments configuring the ejector refrigeration cycles 10 to 10d are not limited to the equipments disclosed in the above embodiments.

In the above embodiment, the electric compressor is applied as the compressor 11. However, the compressor 11 is not limited to this configuration.

For example, the compressor 11 may be configured by an engine driven compressor that is driven by a rotation driving force transmitted from an internal combustion engine (engine) through a pulley, a belt, or the like. The engine driven compressor of this type may be configured by a variable capacity type compressor that can adjust a refrigerant discharge capacity by a change in discharge capacity, or a fixed capacity type compressor that adjusts the refrigerant discharging capacity by changing an operation rate of the compressor through connection/disconnection of an electromagnetic clutch.

Further, in the embodiments described above, an example in which the radiator 13 and the liquid receiver 14 are configured by separate members has been described. Alternatively, the radiator 13 and the liquid receiver 14 may be integrated together.

Further, in the first embodiment described above, an example in which the temperature type expansion valve is employed as the expansion valve 16 has been described. Alternatively, an electric expansion valve may be employed and operate in the same manner.

In the third embodiment described above, an example in which a separator having a relatively small internal capacity is used as the gas-liquid separator 22 has been described. However, it is needless to say that a separator functioning as a liquid storage device that stores an excess liquid-phase refrigerant in the cycle may be employed.

Further, in the fourth embodiment described above, an example in which the branch portion 24 is employed has been described. However, the branch portion 24 may be integrated with the liquid receiver 14. More specifically, three liquid-phase refrigerant outflow ports are provided in the liquid receiver 14, five inlet sides are connected to one liquid-phase refrigerant outflow port, another liquid-phase refrigerant outflow port is connected with an inlet side of the low-pressure nozzle portion 21a of the low-pressure ejector 21, and still another liquid-phase refrigerant outflow port may be connected with the inlet side of the fixed throttle 23.

In the high-pressure ejector 20 and the low-pressure ejector 21 described above, similarly to the liquid ejector 12 of the eighth embodiment, the refrigerant flowing through the refrigerant passages in the nozzle portions 20a and 21a may have a velocity component in a direction of swirling in the axial direction of the nozzle portions 20a and 21a.

In the second embodiment described above, the high-pressure ejector 20 merges the gas-phase refrigerant that has flowed out of the high-pressure evaporator 19 and the gas-phase refrigerant that has been discharged from the compressor 11 to cause the merged refrigerant to flow to the refrigerant inflow port 121b side of the liquid ejector 12. However, instead of the high-pressure ejector 20, a merging portion configured by a three-way joint structure similar to the branch portion 24 may be employed.

More specifically, the operation of the compressor 11 may be controlled so that the pressure of the discharged refrigerant from the compressor 11 becomes equal to the pressure of the gas-phase refrigerant flowing out of the high-pressure evaporator 19. This also applies to the fifth embodiment.

In the above-described embodiment, the example in which R-134a is adopted as the refrigerant has been described. However, the refrigerant is not limited thereto. For example, R-600a, R-1234yf, R-410A, R-404A, R-32, R-1234yfxf, R-407C, or the like may be adopted. Alternatively, a mixture refrigerant in which plural types of these refrigerants are mixed or the like may be adopted.

In the eleventh to fourteenth embodiments described above, an example in which the outlet side pressure sensor 31 for detecting the refrigerant pressure (refrigerant pressure on the liquid ejector outlet side) of the refrigerant flow channel extending from the outlet side of the liquid ejector 12 to the inlet side of the area adjustment valve 26 is employed has been described. However, the outlet side pressure sensor 31 is not limited to the above configuration. It is needless to say that the refrigerant pressure (refrigerant pressure on the radiator inlet side) in the refrigerant flow channel extending from the outlet side of the area adjustment valve 26 to the inlet side of the radiator 13 may be detected.

Further, the liquid ejector 12 described in the sixth to tenth embodiments may be applied to the ejector refrigeration cycles 10 to 10*d* described in the eleventh to fourteenth embodiments.

The present disclosure has been described with reference to the embodiments, but it should be noted that the present disclosure is not limited to the embodiments and the structures. The present disclosure includes various modification examples and modifications within the ranges equivalent to the embodiments. In addition, the scope and technical range of the present disclosure include certain various combinations or forms, and also other combinations or forms including such certain various combinations or forms combined with a single element only, something more than that, or something less than that.

What is claimed is:

1. A liquid ejector for a vapor compression refrigeration cycle device including a compressor that compresses and discharges a refrigerant and a radiator that radiates a heat of the refrigerant, the liquid ejector comprising:
   an inflow passage forming portion that has a cylindrical shape and includes an inflow refrigerant passage into which the refrigerant flows from an outside; and
   a liquid ejection body portion that includes a gas-liquid mixing portion that mixes the refrigerant ejected from an ejection refrigerant passage with the refrigerant flowing from the inflow refrigerant passage, wherein
   the ejection refrigerant passage includes a first refrigerant inflow port into which the refrigerant that has radiated the heat in the radiator flows, and a refrigerant ejection port that ejects the refrigerant into the gas-liquid mixing portion, the ejection refrigerant passage has a passage cross-sectional area that continuously decreases in an axial direction of the inflow passage forming portion from the first refrigerant inflow port to the refrigerant ejection port,
   the inflow refrigerant passage includes a second refrigerant inflow port into which the refrigerant discharged from the compressor flows, and a refrigerant outflow port from which the refrigerant flows out to the gas-liquid mixing portion,
   the refrigerant ejection port has an annular shape in a cross-section perpendicular to the axial direction of the inflow passage forming portion,
   the refrigerant outflow port is disposed on an inner circumferential side of the refrigerant ejection port, and
   upon the refrigerant being ejected into the gas-liquid mixing portion, the refrigerant is ejected on an outer circumferential side of the refrigerant flowing into the gas-liquid mixing portion.

2. The liquid ejector according to claim 1, wherein
   the inflow refrigerant passage has a passage cross-sectional area that continuously decreases in the axial direction of the inflow passage forming portion from the second refrigerant inflow port to the refrigerant outflow port.

3. The liquid ejector according to claim 1, wherein
   the gas-liquid mixing portion has a truncated cone shape whose passage cross-sectional area decreases in the axial direction of the inflow passage forming portion away from the refrigerant ejection port.

4. The liquid ejector according to claim 3, further comprising a divergent passage portion connected to an outlet of the gas-liquid mixing portion, and
   the divergent passage portion defines a refrigerant passage that has a truncated cone shape whose passage cross-sectional area increases in the axial direction of the inflow passage forming portion away from the gas-liquid mixing portion.

* * * * *